United States Patent
Wada et al.

(10) Patent No.: US 11,999,199 B2
(45) Date of Patent: Jun. 4, 2024

(54) PNEUMATIC TIRE

(71) Applicant: The Yokohama Rubber Co., LTD., Tokyo (JP)

(72) Inventors: Hironori Wada, Kanagawa (JP); Kotaro Iwabuchi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 399 days.

(21) Appl. No.: 17/276,666

(22) PCT Filed: Aug. 23, 2019

(86) PCT No.: PCT/JP2019/033149
§ 371 (c)(1),
(2) Date: Mar. 16, 2021

(87) PCT Pub. No.: WO2020/066404
PCT Pub. Date: Apr. 2, 2020

(65) Prior Publication Data
US 2022/0032691 A1 Feb. 3, 2022

(30) Foreign Application Priority Data

Sep. 28, 2018 (JP) ................................. 2018-184481
Sep. 28, 2018 (JP) ................................. 2018-185534

(51) Int. Cl.
*B60C 11/13* (2006.01)
*B60C 11/03* (2006.01)

(52) U.S. Cl.
CPC ... *B60C 11/1323* (2013.01); *B60C 2011/0346* (2013.01); *B60C 2200/06* (2013.01)

(58) Field of Classification Search
CPC ............ B60C 11/1315; B60C 11/1323; B60C 2011/0346
See application file for complete search history.

(56) References Cited

U.S. PATENT DOCUMENTS

| | | | |
|---|---|---|---|
| 6,116,309 A * | 9/2000 | Gillard | B60C 11/0083 152/209.19 |
| 2012/0132333 A1* | 5/2012 | Ebiko | B60C 11/1315 152/209.8 |
| 2015/0151584 A1* | 6/2015 | Koishikawa | B60C 11/0304 152/209.18 |

(Continued)

FOREIGN PATENT DOCUMENTS

| | | | | |
|---|---|---|---|---|
| DE | 102018216403 A1 * | 4/2019 | | B60C 11/03 |
| JP | 5-606 A | 1/1993 | | |

(Continued)

*Primary Examiner* — Robert C Dye
(74) *Attorney, Agent, or Firm* — Thorpe North & Western

(57) ABSTRACT

A pneumatic tire includes a circumferential main groove extending in a tire circumferential direction and a land portion defined by the circumferential main groove. The circumferential main groove includes a groove opening portion and a groove bottom portion each having a zigzag shape or a wave-like shape with an amplitude in a tire width direction. An outer maximum amplitude position of an outer edge portion in the groove opening portion is disposed to be offset in a tire circumferential direction with respect to an outer maximum amplitude position of an outer edge portion of the corresponding groove bottom portion.

27 Claims, 13 Drawing Sheets

(56) References Cited

U.S. PATENT DOCUMENTS

| | | | |
|---|---|---|---|
| 2015/0343849 A1* | 12/2015 | Tanaka | B60C 11/1353 |
| | | | 152/209.19 |
| 2017/0253088 A1* | 9/2017 | Maehara | B60C 11/04 |
| 2018/0170117 A1* | 6/2018 | Wang | B60C 11/045 |
| 2019/0275842 A1 | 9/2019 | Mita | |

FOREIGN PATENT DOCUMENTS

| | | | |
|---|---|---|---|
| JP | 2012-116389 A | | 6/2012 |
| JP | 2013-129409 A | | 7/2013 |
| JP | 2016-5950 A | | 1/2016 |
| JP | 2018-008586 A | | 1/2018 |
| JP | 2018-76001 A | | 5/2018 |
| KR | 20120056209 A | * | 6/2012 |
| WO | 2018/016477 A1 | | 1/2018 |

\* cited by examiner

|  | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 |
|---|---|---|---|---|---|---|---|---|---|---|---|---|
| Φoo/A1o | 0.00 | 0.04 | 0.08 | 0.12 | 0.16 | 0.08 | 0.08 | 0.08 | 0.08 | 0.08 | 0.15 | 0.18 |
| Φoi/A1o | 0.00 | 0.04 | 0.08 | 0.12 | 0.16 | 0.08 | 0.08 | 0.08 | 0.08 | 0.00 | 0.00 | 0.00 |
| A2o/A1o | 1.00 | 1.00 | 1.00 | 1.00 | 1.00 | 1.00 | 1.00 | 1.50 | 1.00 | 1.00 | 1.00 | 1.00 |
| A2o/A1o | 1.00 | 1.00 | 1.00 | 1.00 | 1.00 | 0.70 | 1.10 | 1.50 | 1.80 | 1.00 | 1.00 | 1.00 |
| L1o/A1o | 0.50 | 0.50 | 0.50 | 0.50 | 0.50 | 0.50 | 0.50 | 0.50 | 0.50 | 0.50 | 0.50 | 0.50 |
| L2o/A2o | 0.50 | 0.50 | 0.50 | 0.50 | 0.50 | 0.50 | 0.50 | 0.50 | 0.50 | 0.58 | 0.65 | 0.68 |
| L2o/L1o | 1.00 | 1.00 | 1.00 | 1.00 | 1.00 | 1.00 | 1.00 | 1.00 | 1.00 | 1.15 | 1.30 | 1.35 |
| STONE REJECTING PERFORMANCE | 100 | 101 | 105 | 106 | 105 | 105 | 106 | 107 | 108 | 107 | 107 | 109 |
| TEAR RESISTANCE PERFORMANCE | 100 | 101 | 106 | 104 | 103 | 104 | 106 | 110 | 105 | 106 | 110 | 112 |

FIG. 11

| | CONVENTIONAL EXAMPLE | COMPARATIVE EXAMPLE | EXAMPLE 12 | EXAMPLE 13 | EXAMPLE 14 | EXAMPLE 15 | EXAMPLE 16 |
|---|---|---|---|---|---|---|---|
| $\lambda 1o\_sh/\lambda 1o\_ce$ | 1.00 | 1.00 | 1.00 | 1.00 | 1.00 | 1.00 | 1.00 |
| $\Phi oo\_sh/\lambda 1o\_sh$ | 0.00 | 0.10 | 0.10 | 0.35 | 0.15 | 0.20 | 0.25 |
| $\Phi oo\_ce/\lambda 1o\_ce$ | 0.00 | 0.10 | 0.10 | 0.35 | 0.15 | 0.15 | 0.10 |
| $(\Phi oo\_sh - \Phi oo\_ce)/\lambda 1o$ | - | 0.00 | 0.00 | 0.00 | 0.00 | 0.05 | 0.15 |
| $\delta/\lambda 1o\_sh$ | 0.08 | 0.08 | 0.02 | 0.02 | 0.02 | 0.02 | 0.02 |
| $A1o\_sh/A1o\_ce$ | 1.00 | 1.00 | 1.00 | 1.00 | 1.00 | 1.00 | 1.00 |
| $A2o\_sh/A2o\_ce$ | 1.00 | 1.00 | 1.00 | 1.00 | 1.00 | 1.00 | 1.00 |
| $\theta 1o\_sh/\theta 1o\_ce$ | 1.00 | 1.00 | 1.00 | 1.00 | 1.00 | 1.00 | 1.00 |
| $\theta 2o\_sh/\theta 2o\_ce$ | 0.50 | 0.50 | 0.50 | 0.50 | 0.50 | 0.50 | 0.50 |
| $L1o\_sh/A1o\_sh$ | 0.50 | 0.50 | 0.50 | 0.50 | 0.50 | 0.50 | 0.50 |
| $L1o\_ce/A1o\_ce$ | 1.00 | 1.00 | 1.00 | 1.00 | 1.00 | 1.00 | 1.00 |
| $L1o\_sh/L1o\_ce$ | 0.50 | 0.50 | 0.50 | 0.50 | 0.50 | 0.50 | 0.50 |
| $L2o\_sh/A2o\_sh$ | 0.50 | 0.50 | 0.50 | 0.50 | 0.50 | 0.50 | 0.50 |
| $L2o\_ce/A2o\_ce$ | 0.50 | 0.50 | 0.50 | 0.50 | 0.50 | 0.50 | 0.50 |
| $Wg1\_sh/Wg1\_ce$ | 1.10 | 1.10 | 1.10 | 1.10 | 1.10 | 1.10 | 1.10 |
| $Wg2\_sh/Wg2\_ce$ | 1.10 | 1.10 | 1.10 | 1.10 | 1.10 | 1.10 | 1.10 |
| TEAR RESISTANCE PERFORMANCE | 100 | 102 | 103 | 101 | 105 | 107 | 105 |
| UNEVEN WEAR RESISTANCE PERFORMANCE | 100 | 101 | 104 | 102 | 107 | 108 | 105 |

FIG. 12A

|  | EXAMPLE 17 | EXAMPLE 18 | EXAMPLE 19 | EXAMPLE 20 | EXAMPLE 21 | EXAMPLE 22 | EXAMPLE 23 | EXAMPLE 24 |
|---|---|---|---|---|---|---|---|---|
| A1o_sh/A1o_ce | 1.00 | 1.00 | 1.00 | 1.00 | 1.00 | 1.00 | 1.00 | 1.00 |
| Φoo_sh/A1o_sh | 0.10 | 0.10 | 0.10 | 0.10 | 0.10 | 0.10 | 0.10 | 0.10 |
| Φoo_ce/A1o_ce | 0.00 | 0.00 | 0.00 | 0.00 | 0.00 | 0.00 | 0.00 | 0.00 |
| (Φoo_sh − Φoo_ce)/A1o | 0.10 | 0.10 | 0.10 | 0.10 | 0.10 | 0.10 | 0.10 | 0.10 |
| δ/A1o_sh | 0.02 | 0.02 | 0.02 | 0.02 | 0.02 | 0.02 | 0.02 | 0.02 |
| A1o_sh/A1o_ce | 1.00 | 1.00 | 1.00 | 0.50 | 0.70 | 1.00 | 1.00 | 1.00 |
| A2o_sh/A2o_ce | 1.00 | 1.00 | 1.00 | 0.50 | 0.50 | 1.00 | 1.00 | 1.00 |
| θ1o_sh/θ1o_ce | 1.00 | 1.00 | 0.60 | 1.60 | 1.60 | 1.60 | 1.60 | 1.60 |
| θ2o_sh/θ2o_ce | 1.00 | 1.00 | 1.00 | 1.00 | 1.30 | 1.30 | 1.30 | 1.30 |
| L1o_sh/A1o_sh | 0.50 | 0.55 | 0.60 | 0.50 | 0.50 | 0.50 | 0.50 | 0.50 |
| L1o_ce/A1o_ce | 0.50 | 0.55 | 0.50 | 0.50 | 0.50 | 0.50 | 0.50 | 0.50 |
| L1o_sh/L1o_ce | 1.00 | 1.00 | 1.20 | 1.00 | 1.00 | 1.00 | 1.00 | 1.00 |
| L2o_sh/A2o_sh | 0.50 | 0.60 | 0.55 | 0.50 | 0.50 | 0.57 | 0.57 | 0.57 |
| L2o_ce/A2o_ce | 0.50 | 0.60 | 0.65 | 0.50 | 0.50 | 0.60 | 0.70 | 0.45 |
| Wg1_sh/Wg1_ce | 1.10 | 1.10 | 1.10 | 1.10 | 1.10 | 1.10 | 0.77 | 0.77 |
| Wg2_sh/Wg2_ce | 1.10 | 1.10 | 1.10 | 1.10 | 1.10 | 1.10 | 1.10 | 0.63 |
| TEAR RESISTANCE PERFORMANCE | 102 | 110 | 111 | 113 | 111 | 115 | 114 | 113 |
| UNEVEN WEAR RESISTANCE PERFORMANCE | 103 | 111 | 109 | 111 | 109 | 113 | 112 | 111 |

FIG. 12B

PNEUMATIC TIRE

TECHNICAL FIELD

The technology relates to a pneumatic tire and particularly relates to a pneumatic tire that can improve tear resistance performance of a tire.

BACKGROUND ART

A heavy duty tire, particularly a tire for a garbage truck traveling streets under a traveling condition at high applied loads, has a problem that a rib tear occurs due to riding over a curb or a projection on a traveling road. A technology described in Japan Unexamined Patent Publication No. 2018-008586 is a known pneumatic tire in the related art that addresses this problem.

SUMMARY

The technology provides a pneumatic tire that allows improving tear resistance performance of a tire.

A pneumatic tire according to an embodiment of the technology includes a circumferential main groove and a land portion. The circumferential main groove extends in a tire circumferential direction. The land portion is defined by the circumferential main groove. The circumferential main groove includes a groove opening portion and a groove bottom portion each having a zigzag shape or a wave-like shape with an amplitude in a tire width direction. In each of the groove opening portion and the groove bottom portion, an outer edge portion on an outer side in the tire width direction is defined. An outer maximum amplitude position projecting to the outer side in the tire width direction and an inner maximum amplitude position projecting to an inner side in the tire width direction are defined in the outer edge portion. The outer maximum amplitude position of the outer edge portion in the groove opening portion is disposed to be offset in the tire circumferential direction with respect to the outer maximum amplitude position of the outer edge portion of the corresponding groove bottom portion.

Additionally, a pneumatic tire according to an embodiment of the technology includes a circumferential main groove and a land portion. The circumferential main groove extends in a tire circumferential direction. The land portion is defined by the circumferential main groove. The circumferential main groove includes a groove opening portion and a groove bottom portion each having a zigzag shape or a wave-like shape with an amplitude in a tire width direction. An outer maximum amplitude position projecting to an outer side in the tire width direction and an inner maximum amplitude position projecting to an inner side in the tire width direction are defined in a center line of each of the groove opening portion and the groove bottom portion. The outer maximum amplitude position of the center line of the groove opening portion is disposed to be offset in the tire circumferential direction with respect to the outer maximum amplitude position of the center line of the corresponding groove bottom portion.

Additionally, a pneumatic tire according to an embodiment of the technology includes a plurality of circumferential main grooves and a plurality of land portions. The plurality of circumferential main grooves extend in a tire circumferential direction. The plurality of land portions are defined by the plurality of circumferential main grooves. The first and second circumferential main grooves adjacent to one another each include a groove opening portion and a groove bottom portion each having a zigzag shape or a wave-like shape with an amplitude in a tire width direction. In each of the groove opening portion and the groove bottom portion, an outer edge portion on an outer side in the tire width direction and an inner edge portion on an inner side in the tire width direction are defined. An outer maximum amplitude position projecting to the outer side in the tire width direction and an inner maximum amplitude position projecting to the inner side in the tire width direction are defined in each of the outer edge portion and the inner edge portion. In the first circumferential main groove, an offset amount $\varphi oo$ in the tire circumferential direction between the outer maximum amplitude position of the groove opening portion and the outer maximum amplitude position of the groove bottom portion has a relationship $0.03 \leq \varphi oo / \lambda 1o \leq 0.25$ to a wavelength $\lambda 1o$ of the outer edge portion of the groove opening portion. A displacement amount $\delta$ in the tire circumferential direction between the outer maximum amplitude position of the groove bottom portion in the first circumferential main groove and the outer maximum amplitude position of the groove bottom portion in the second circumferential main groove has a relationship $0 \leq \delta / \lambda 1o \leq 0.03$ to the wavelength $\lambda 1o$ of the groove opening portion in the first circumferential main groove.

In the pneumatic tire according to the embodiment of the technology, the outer maximum amplitude position of the outer edge portion of the groove bottom portion in a shoulder main groove is disposed to be offset in the tire circumferential direction with respect to a position where a ground contact width of the shoulder land portion is minimized. Thus, compared with a configuration in which outer maximum amplitude positions of a groove opening portion and a groove bottom portion are at an identical position in a tire circumferential direction, rigidity of the shoulder land portion is sterically reinforced. This has an advantage that a tear of the shoulder land portions is suppressed, and tear resistance performance of the tire is improved.

In the pneumatic tire according to the embodiment of the technology, (1) since the groove opening portion and the groove bottom portion are mutually offset in the tire circumferential direction at the outer edge portion in the tire width direction in the first circumferential main groove, rigidity of the land portion defined by the outer edge portion in the circumferential main groove is reinforced. This suppresses the tear of the land portion and improves the tear resistance performance of the tire. At the same time, (2) since the outer maximum amplitude positions of the groove bottom portions of the adjacent circumferential main grooves are disposed with positions in the tire circumferential direction aligned, the rigidity of the land portions is made uniform. As a result, uneven wear of the land portions is suppressed, and uneven wear resistance performance of the tire is maintained. There is an advantage that tear resistance performance can be improved with the uneven wear resistance performance of the tire maintained by (1) and (2).

BRIEF DESCRIPTION OF DRAWINGS

FIG. 11 is a table showing the results of performance tests of pneumatic tires according to embodiments of the technology.

FIGS. 12A-12B include a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
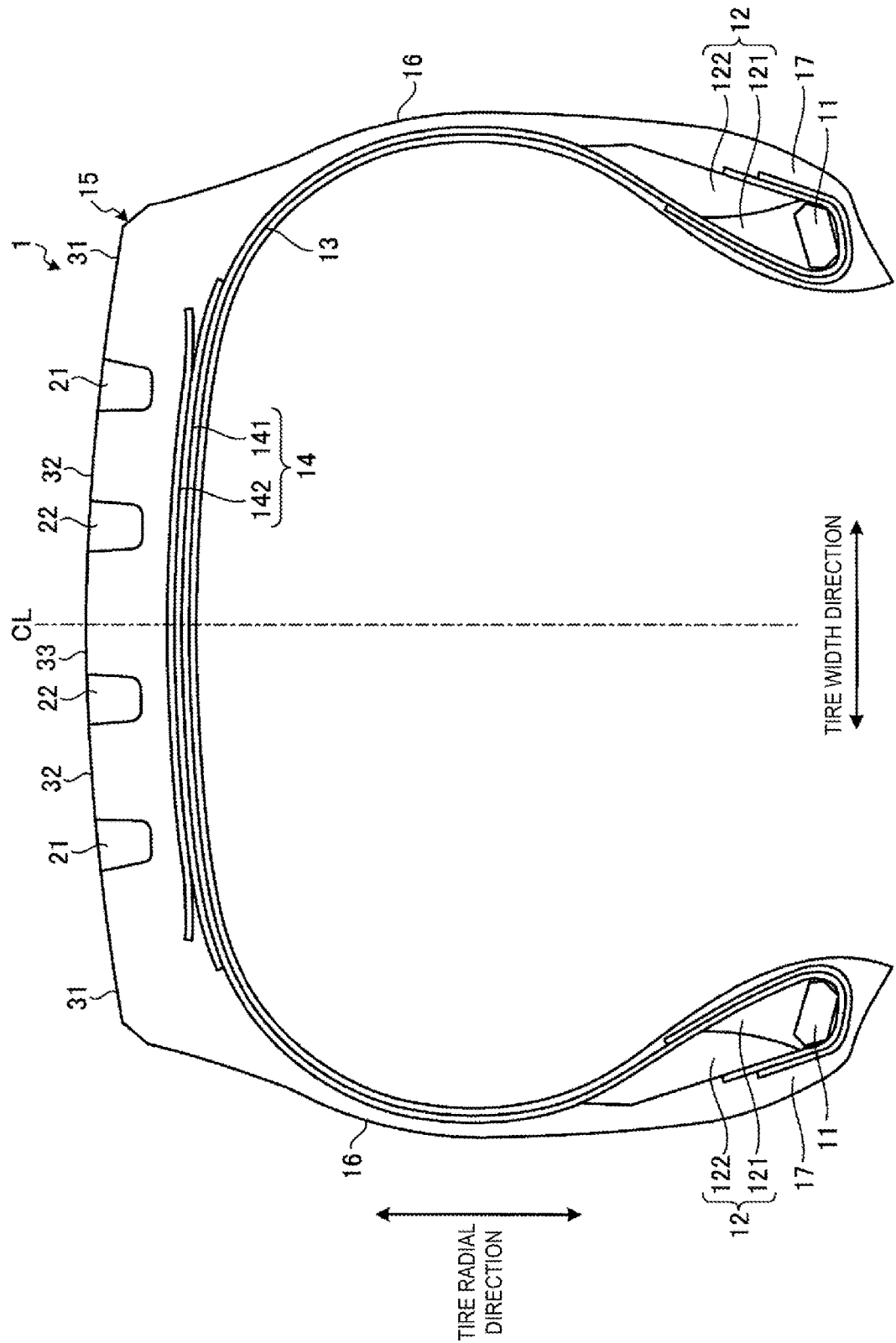
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The identical drawing illustrates a cross-sectional view of a half region in the tire radial direction. The identical drawing illustrates a heavy duty tire mounted on a garbage truck as an example of the pneumatic tire.

In reference to the identical drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire width direction" refers to the direction parallel with the tire rotation axis. "Tire radial direction" refers to the direction perpendicular to the tire rotation axis.

A pneumatic tire 1 has an annular structure with the tire rotation axis as its center and includes: a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are formed by winding one or a plurality of bead wires made of steel by multiple times in an annular shape and are embedded in the bead portion to constitute a core of the left and right bead portions. The pair of bead fillers 12, 12 are disposed outward of the pair of bead cores 11, 11 in the tire radial direction and reinforce the bead portions.

The carcass layer 13 has a single layer structure made from one carcass ply or a multilayer structure made from a plurality of stacked carcass plies and spans between the left and right bead cores 11, 11 in a toroidal shape to form the framework of the tire. Additionally, both end portions of the carcass layer 13 are turned back to the outer side in the tire width direction so as to wrap around the bead cores 11 and the bead fillers 12 and fixed. The carcass ply of the carcass layer 13 is formed by performing a rolling process on coating a plurality of rubber-covered carcass cords made of steel or an organic fiber material (for example, aramid, nylon, polyester, or rayon) and has a carcass angle (defined as an inclination angle in a longitudinal direction of the carcass cords with respect to a tire circumferential direction) ranging from not less than 80 degrees to not greater than 100 degrees as an absolute value.

The belt layer 14 is a multilayer structure including a pair of cross belts 141, 142 and is disposed around the outer circumference of the carcass layer 13. The pair of cross belts 141, 142 are made by performing a rolling process on coating rubber-covered belt cords made from steel or an organic fiber material. The cross belts 141, 142 have a belt angle, as an absolute value, ranging from 15° to 55°. Furthermore, the pair of cross belts 141, 142 have belt angles (defined as the inclination angle in the longitudinal direction of the belt cords with respect to the tire circumferential direction) of opposite signs and are stacked so that the longitudinal directions of the belt cords intersect each other (a so-called crossply structure).

The tread rubber 15 is disposed outward of the carcass layer 13 and the belt layer 14 in the tire radial direction and constitutes a tread portion. The pair of sidewall rubbers 16, 16 are disposed on the outer side of the carcass layer 13 in the tire width direction and constitute left and right sidewall portions. The pair of rim cushion rubbers 17, 17 extend from the inner sides in the tire radial direction of the turned back portions of the carcass layer 13 and the left and right bead cores 11, 11 toward the outer side in the tire width direction to form a rim-fitting surface of the bead portion.

Tread Pattern

Figure 2:
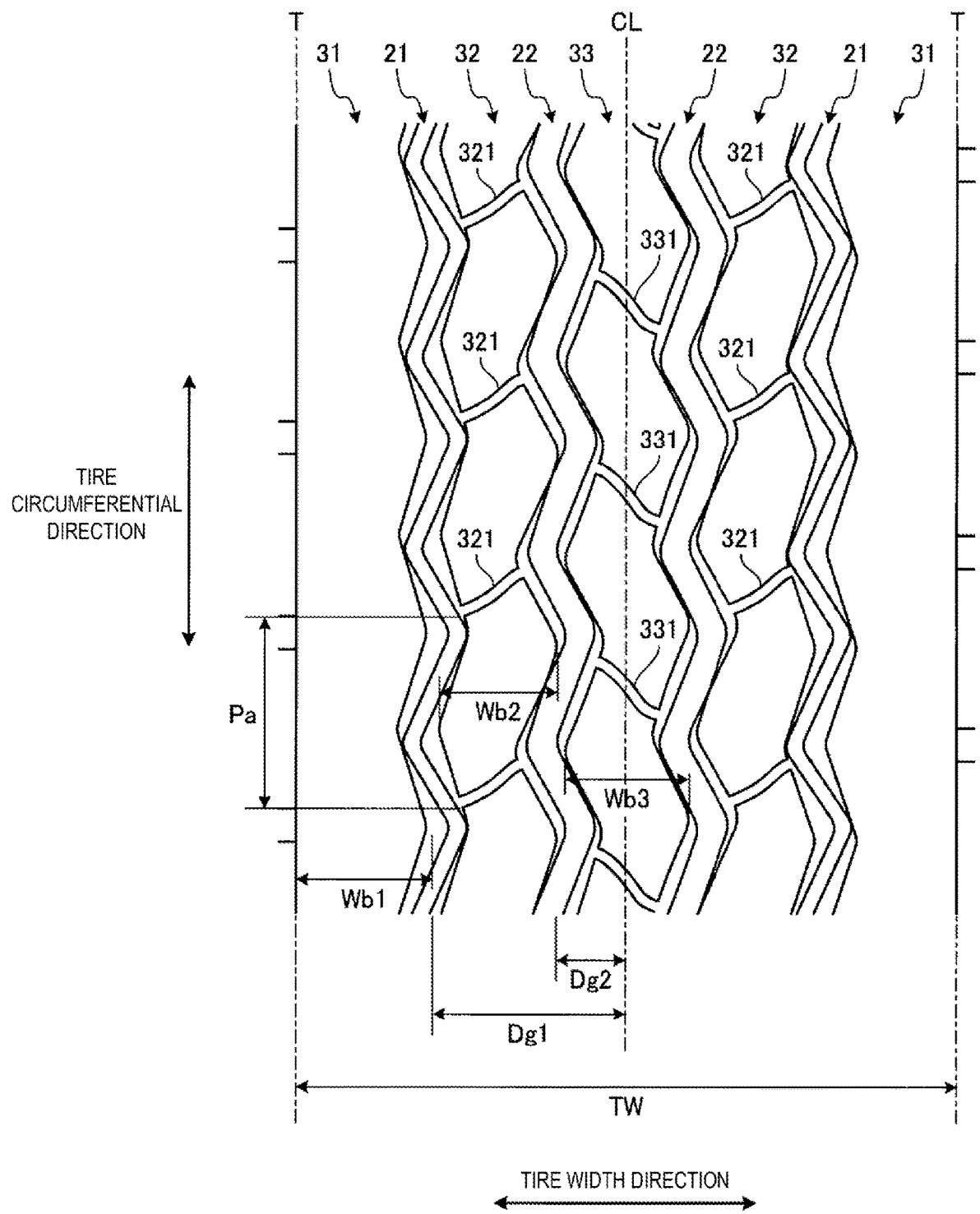
FIG. 2 is a plan view illustrating a tread surface of the pneumatic tire illustrated in FIG. 1.

FIG. 2 is a plan view illustrating a tread surface of the pneumatic tire illustrated in FIG. 1. The identical drawing illustrates a tread surface of an all-position tire that can travel on on-roads and off-roads. In reference to the identical drawing, "tire circumferential direction" refers to the direction revolving about the tire rotation axis. Reference sign T denotes a tire ground contact edge, and dimension sign TW denotes a tire ground contact width.

As illustrated in FIG. 2, the pneumatic tire 1 includes a plurality of circumferential main grooves 21, 22 extending in the tire circumferential direction and a plurality of land portions 31, 32, 33 defined by the circumferential main grooves 21, 22 in the tread surface.

"Main groove" refers to a groove on which a wear indicator must be provided as specified by JATMA (The Japan Automobile Tyre Manufacturers Association, Inc.) and has the maximum groove width of not less than 7.0 mm and the maximum groove depth of not less than 12 mm.

The groove width is measured as the distance between the left and right groove walls at the groove opening portion when the tire is mounted on a specified rim, inflated to the specified internal pressure, and in an unloaded state. In a configuration in which the land portions include notch portions or chamfered portions in the edge portions thereof, the groove width is measured with reference to the intersection points between the tread contact surface and the extension lines of the groove walls as measurement points, in a cross-sectional view in which the groove length direction is a normal direction.

The groove depth is measured as a distance from the tread contact surface to a groove bottom when the tire is mounted on a specified rim, inflated to the specified internal pressure, and in an unloaded state. Additionally, in a configuration in which the grooves include an uneven portion or sipes on the groove bottom, the groove depth is measured excluding these portions.

"Specified rim" refers to a "standard rim" defined by JATMA, a "Design Rim" defined by TRA (The Tire & Rim Association, Inc.), or a "Measuring Rim" defined by ETRTO (The European Tyre and Rim Technical Organisation). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, the pneumatic tire 1 has an approximately point symmetric tread pattern having a center point on the tire equatorial plane CL. However, no such limitation is intended, and, for example, the pneumatic tire 1 may have a left-right axisymmetric tread pattern or a left-right asymmetric tread pattern with respect to the tire equatorial plane CL as the center and may have a tread pattern having directionality in the tire rotation direction (not illustrated).

Furthermore, in the configuration of FIG. 2, the left and right regions demarcated by the tire equatorial plane CL each have two circumferential main grooves 21, 22. These circumferential main grooves 21, 22 are disposed in left-right symmetry with respect to the tire equatorial plane CL as the center. Five rows of land portions 31 to 33 are defined by these circumferential main grooves 21, 22. In addition, one land portion 33 is disposed on the tire equatorial plane CL.

However, no such limitation is intended, and three, or five or more circumferential main grooves may be disposed, or the circumferential main grooves may be arranged asymmetrically with respect to the tire equatorial plane CL (not illustrated). In addition, the land portion may be arranged at a position off from the tire equatorial plane CL, with one circumferential main groove being arranged on the tire equatorial plane CL (not illustrated).

Additionally, among the circumferential main grooves 21, 22 disposed in one region demarcated by the tire equatorial plane CL, the circumferential main groove 21 on the outermost side in the tire width direction is defined as the shoulder main groove, and the circumferential main groove 22 close to the tire equatorial plane CL is defined as the center main groove.

For example, in the configuration of FIG. 2, a distance Dg1 from the tire equatorial plane CL to groove center lines of the left and right shoulder main grooves 21, 21 is in a range of from not less than 26% to not greater than 32% of a tire ground contact width TW. A distance Dg2 from the tire equatorial plane CL to groove center lines of the left and right center main grooves 22, 22 is in a range of from not less than 8% to not greater than 12% of the tire ground contact width TW.

The groove center line is defined as an imaginary line connecting midpoints of measurement points of the groove width. A distance to the groove center line in a case where the groove center line of the main groove has a zigzag shape or a wave-like shape is measured using a straight line parallel to the tire circumferential direction passing through midpoints of the maximum amplitude positions on the left and right of the groove center line as the measurement point.

The tire ground contact width TW is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to the specified load.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

The land portions 31 located on the outer side in the tire width direction defined by the shoulder main grooves 21 are defined as shoulder land portions. The shoulder land portion 31 is a land portion on the outermost side in the tire width direction and is located on the tire ground contact edge T. The land portions 32 located on the inner side in the tire width direction defined by the shoulder main grooves 21 are defined as second land portions. The second land portion 32 is adjacent to the shoulder land portion 31 with the shoulder main groove 21 disposed therebetween. The land portion 33 located closer to the tire equatorial plane CL side than the second land portions 32 is defined as a center land portion. The center land portion 33 may be disposed on the tire equatorial plane CL (see FIG. 2) or may be arranged at a position off from the tire equatorial plane CL (not illustrated).

Note that in a configuration including the four circumferential main grooves 21, 22 as in FIG. 2, the pair of shoulder land portions 31, 31, the pair of second land portions 32, 32, and the single center land portion 33 are defined. For example, in a configuration including five or more circumferential main grooves, two or more rows of center land portions are defined (not illustrated), and in a configuration including three circumferential main grooves, a second land portion also serves as a center land portion (not illustrated).

In the configuration of FIG. 2, a maximum ground contact width Wb1 of the shoulder land portion 31 has the relationship $0.15 \leq Wb1/TW \leq 0.25$ to the tire ground contact width TW. A maximum ground contact width Wb3 of the center land portion 33 closest to the tire equatorial plane CL preferably has the relationship $0.15 \leq Wb3/TW \leq 0.25$ to the tire ground contact width TW, and more preferably has the relationship $0.18 \leq Wb3/TW \leq 0.23$. Additionally, in the configuration including the four circumferential main grooves 21, 22 and the five rows of the land portions 31 to 33 as illustrated in FIG. 2, a maximum ground contact width Wb2 of the second land portion 32 is preferably slightly narrower than the maximum ground contact width Wb1 of the shoulder land portion 31, and specifically in the range $0.85 \leq Wb2/Wb1 \leq 0.95$.

In the configuration of FIG. 2, all of the circumferential main grooves 21, 22 have a zigzag shape or a wave-like shape with an amplitude in the tire width direction.

Additionally, the shoulder land portion 31 is a rib having a road contact surface continuous in the tire circumferential direction, and does not include lug grooves. Additionally, the second land portion 32 and the center land portion 33 include a plurality of lug grooves 321, 331, respectively. The lug grooves 321, 331 have an open structure that penetrate the land portions 32, 33 and are arranged at predetermined intervals in the tire circumferential direction. As a result, the second land portion 32 and the center land portion 33 are divided in the tire circumferential direction by the lug grooves 321, 331 to form block rows.

Outer Edge Portion of Shoulder Main Groove

Figure 3:
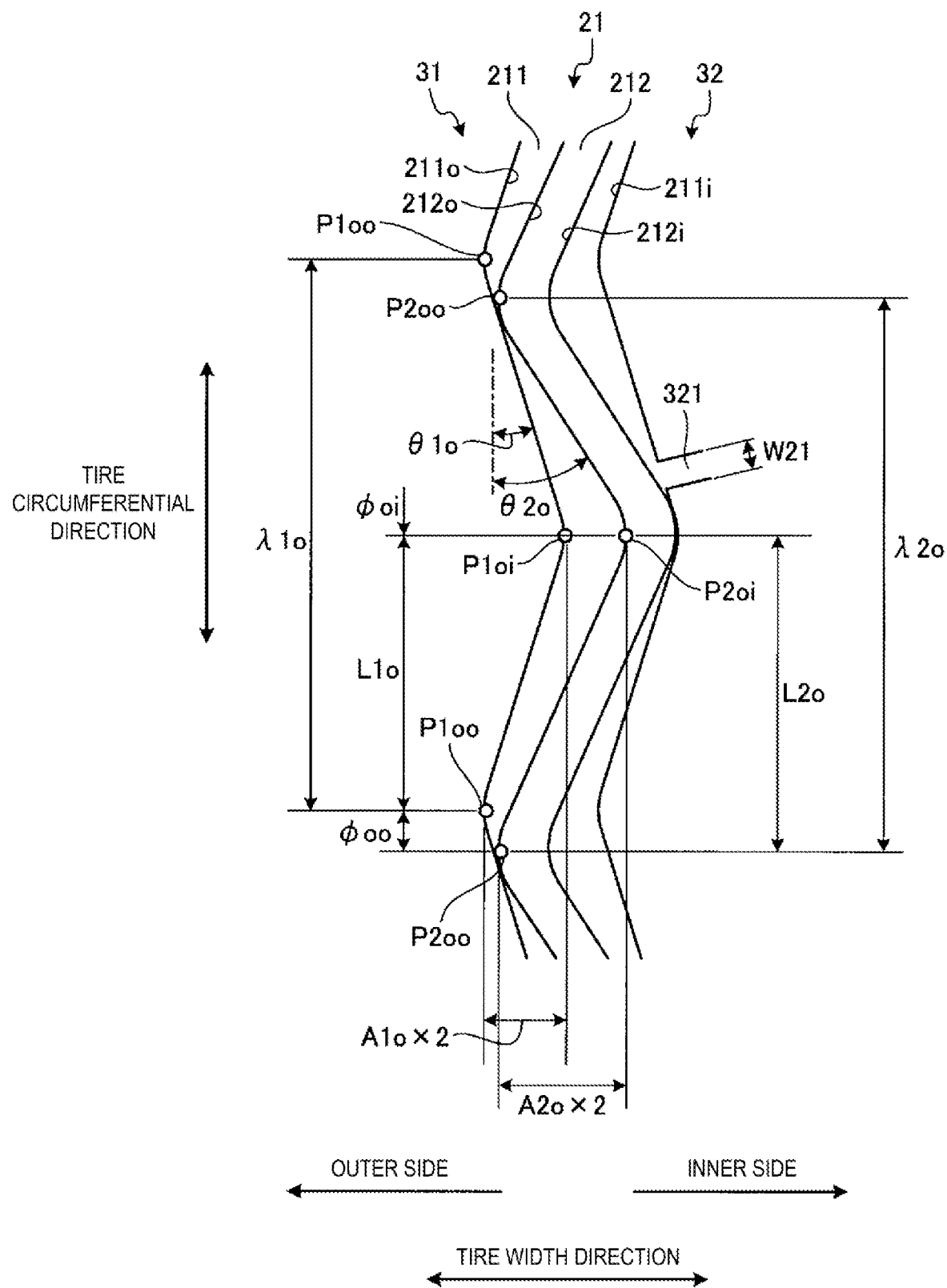
FIG. 3 is an explanatory diagram illustrating a groove wall structure of a circumferential main groove illustrated in FIG. 2.
Figure 4:
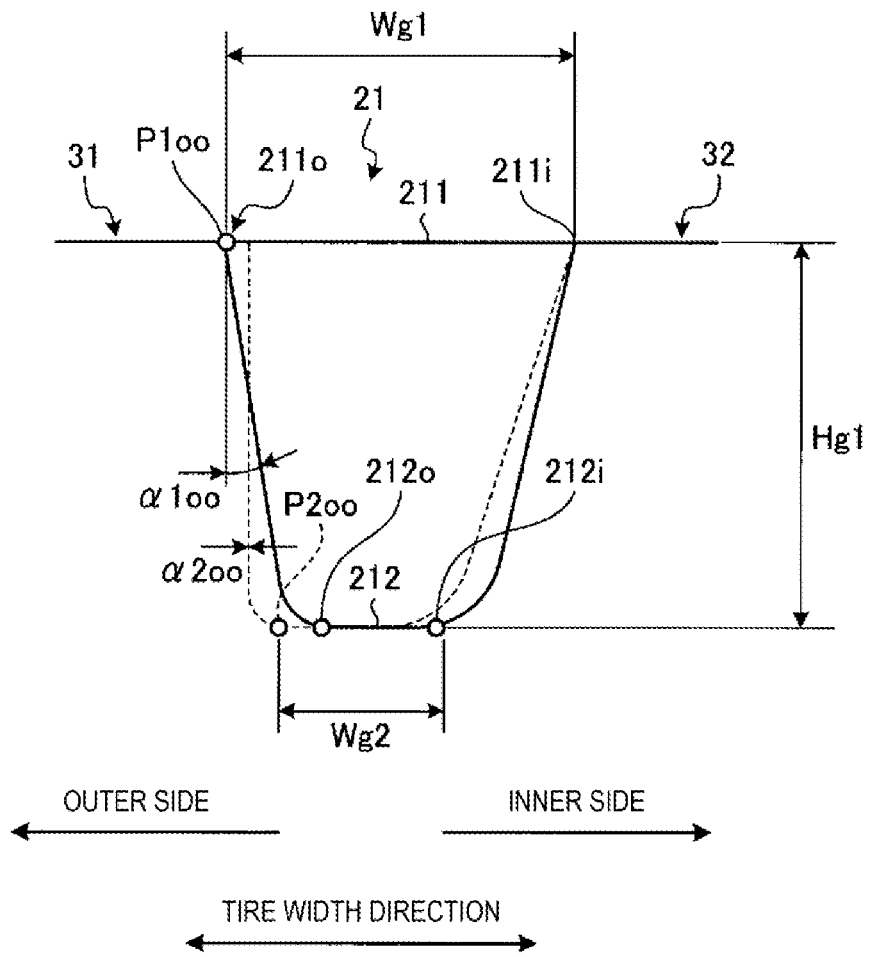
FIG. 4 is an explanatory diagram illustrating the groove wall structure of the circumferential main groove illustrated in FIG. 2.
Figure 5:
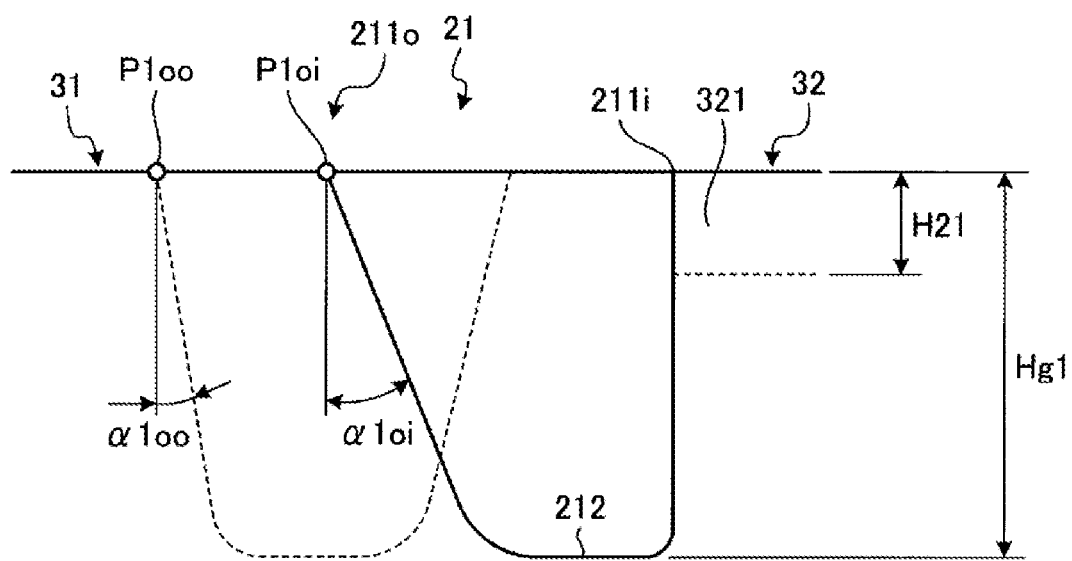
FIG. 5 is an explanatory diagram illustrating the groove wall structure of the circumferential main groove illustrated in FIG. 2.

FIGS. 3 to 5 are explanatory diagrams illustrating a groove wall structure of the circumferential main groove illustrated in FIG. 2. In these drawings, FIG. 3 illustrates an enlarged view of the shoulder main groove 21, and FIGS. 4 and 5 illustrate cross-sectional views in a groove depth direction of the shoulder main groove 21.

In the configuration of FIG. 2, as illustrated in FIG. 3, respective groove opening portion 211 and groove bottom portion 212 in the shoulder main groove 21 have a zigzag shape or a wave-like shape with the amplitude in the tire width direction.

Here, in the respective groove opening portion and groove bottom portion in the main groove, the outer edge portions and inner edge portions in the tire width direction are defined. Additionally, in the respective outer edge portions and inner edge portions, outer maximum amplitude positions that project to the outer side in the tire width direction and inner maximum amplitude positions that project to the inner side in the tire width direction are defined.

The edge portion of the groove opening portion is defined by an imaginary line connecting intersection points (see, for example, FIG. 4) of groove walls and a tread profile in a cross-sectional view in the groove depth direction. In a configuration in which the edge portion includes a chamfered portion, an imaginary line of the edge portion of the groove opening portion is drawn by connecting intersection points (not illustrated) of extension lines of groove walls and a tread profile.

The edge portion of the groove bottom portion is defined by an imaginary line connecting maximum groove depth positions in the cross-sectional view in the groove depth direction. When the groove bottom portion of the main groove is a flat straight line at the maximum groove depth position (see, for example, FIG. 4), the outer edge portion and the inner edge portion of the groove bottom portion are defined at both respective end points of the flat straight line. Meanwhile, when the groove bottom portion of the main groove has an arc shape or a funnel shape (not illustrated), the maximum groove depth position is one point, and the edge portion of the groove bottom portion is defined by one point. Accordingly, the outer edge portion and the inner edge portion of the groove bottom portion described above are at the identical position. The maximum groove depth position of the main groove is defined excluding a raised bottom portion, which is partially formed in the groove bottom portion of the main groove.

In the configuration of FIG. 3, the groove opening portion 211 of the shoulder main groove 21 has a zigzag shape with an amplitude in the tire width direction at respective outer edge portion 211o on the shoulder land portion 31 side and inner edge portion 211i on the second land portion 32 side. Furthermore, the groove bottom portion 212 of the shoulder main groove 21 has a zigzag shape with an amplitude in the tire width direction at respective outer edge portion 212o on the shoulder land portion 31 side and an inner edge portion 212i on the second land portion 32 side.

As illustrated in FIG. 3, an outer maximum amplitude position P1oo of the outer edge portion 211o of the groove opening portion 211 in the shoulder main groove 21 is disposed to be offset in the tire circumferential direction with respect to an outer maximum amplitude position P2oo of the outer edge portion 212o of the groove bottom portion 212. In other words, in a groove wall on the shoulder land portion 31 side of the shoulder main groove 21, the zigzag shape of the outer edge portion 211o of the groove opening portion 211 and the zigzag shape of the outer edge portion 212o of the groove bottom portion 212 are disposed with phases shifted from one another at the outer maximum amplitude positions P1oo, P2oo, which project to the outer side in the tire width direction.

In the configuration described above, (1) the outer maximum amplitude position P2oo of the outer edge portion 212o of the groove bottom portion 212 in the shoulder main groove 21 is disposed to be offset in the tire circumferential direction with respect to the position where the ground contact width of the shoulder land portion 31 is minimized (that is, the outer maximum amplitude position P1oo of the groove opening portion 211). Thus, compared with a configuration (not illustrated) in which the outer maximum amplitude positions P1oo, P2oo of the groove opening portion 211 and the groove bottom portion 212 are at the identical position in the tire circumferential direction, rigidity of the groove wall of the shoulder land portion 31 is sterically reinforced. This suppresses a tear of the shoulder land portion 31 and improves tear resistance performance of the tire.

Additionally, (2) since the outer maximum amplitude positions P1oo, P2oo of the groove opening portion 211 and the groove bottom portion 212 in the shoulder main groove 21 move in the tire circumferential direction toward the groove depth direction, compared with a configuration (not illustrated) in which the outer maximum amplitude positions P1oo, P2oo of the groove opening portion 211 and the groove bottom portion 212 are at the identical position in the tire circumferential direction, an entrance of a foreign material in the shoulder main grooves 21 is suppressed, and discharge of a foreign material from the shoulder main groove 21 is promoted. This improves stone rejecting performance of the tire.

An offset amount φoo (see FIG. 3) between the outer maximum amplitude positions P1oo, P2oo in the outer edge portions 211o, 212o of the groove opening portion 211 and the groove bottom portion 212 in the shoulder main groove 21 preferably has the relationship $0.03 \leq \varphi oo/\lambda 1o \leq 0.45$ to a wavelength $\lambda 1o$ of the outer edge portion 211o of the groove opening portion 211, and more preferably has the relationship $0.10 \leq \varphi oo/\lambda 1o \leq 0.25$. As a result, the offset amount φoo between the outer maximum amplitude positions P1oo, P2oo is made appropriate.

The offset amount between the maximum amplitude positions is a distance between the maximum amplitude positions in the tire circumferential direction in a tread plan view, and measured when the tire is mounted on a specified rim, inflated to the specified internal pressure, and in an unloaded state.

Furthermore, the wavelength $\lambda 1o$ of the outer edge portion 211o of the groove opening portion 211 in the shoulder main groove 21 is set to be substantially identical to a wavelength $2o$ of the outer edge portion 212o of the groove bottom portion 212. Specifically, the wavelengths $\lambda 1o$, $\lambda 2o$ of the groove opening portion 211 and the groove bottom portion 212 are in the range $0.90 \leq \lambda 2o/\lambda 1o \leq 1.10$.

Additionally, the wavelength $\lambda 1o$ of the groove opening portion 211 in the shoulder main groove 21 is preferably in the range $0.90 \leq \lambda 1o/Pa \leq 1.10$ to a pitch length Pa (see FIG. 2) of the lug grooves 321 in the second land portion 32, and more preferably in the range $0.95 \leq \lambda 1o/Pa \leq 1.05$. Accordingly, the wavelength $\lambda 1o$ of the groove opening portion 211 is set to be substantially identical to the pitch length Pa of the lug grooves 321. Note that in the configuration of FIG. 3, the total number of pitches of the lug grooves 321 in the second land portions 32 in the entire circumference of the tire is in the range of from not less than 30 to not greater than 60.

Additionally, an amplitude A1o of the outer edge portion 211*o* of the groove opening portion 211 in the shoulder main groove 21 preferably has the relationship $1.00 \leq A2o/A1o \leq 2.00$ to an amplitude A2o of the outer edge portion 212*o* of the groove bottom portion 212, and more preferably has the relationship $1.30 \leq A2o/A1o \leq 1.80$. Accordingly, the amplitude A2o of the zigzag shape of the groove bottom portion 212 is set to be equal to greater than the amplitude A1o of the zigzag shape of the groove opening portion 211. The amplitude A1o of the groove opening portion 211 in the shoulder main groove 21 has the relationship $0.10 \leq A1o/\lambda 1o \leq 0.25$ to the wavelength $\lambda 1o$ of the groove opening portion 211 in the shoulder land portion 31.

Additionally, a maximum inclination angle $\theta 1o$ of the outer edge portion 211*o* of the groove opening portion 211 in the shoulder main groove 21 with respect to the tire circumferential direction has the relationship $\theta 1o < \theta 2o$ to a maximum inclination angle $\theta 2o$ of the outer edge portion 212*o* of the groove bottom portion 212 with respect to the tire circumferential direction. That is, the maximum inclination angle $\theta 2o$ of the groove bottom portion 212 is greater than the maximum inclination angle $\theta 1o$ of the groove opening portion 211, and the inclination angle of the groove wall of the shoulder main groove 21 increases from the groove opening portion 211 to the groove bottom portion 212.

The inclination angle of the edge portion is measured as an inclination angle with respect to the tire circumferential direction of an imaginary straight line connecting maximum amplitude positions of the zigzag shape or the wave-like shape of the edge portion in the tread plan view.

Additionally, the maximum inclination angles $\theta 1o$, $\theta 2o$ of the groove opening portion 211 and the groove bottom portion 212 preferably have the relationship $1.50 \leq \theta 2o/\theta 1o \leq 2.00$. As a result, a ratio between the maximum inclination angles $\theta 1o$, $\theta 2o$ of the groove opening portion 211 and the groove bottom portion 212, $\theta 2o/\theta 1o$, is made appropriate. In addition, a difference between the maximum inclination angles $\theta 1o$, $\theta 2o$, which is $\theta 2o-\theta 1o$, is preferably not less than 5 degrees.

In the configuration of FIG. 3, the groove opening portion 211 in the shoulder main groove 21 has the zigzag shape formed by connecting linear portions having a substantially identical length in the tire circumferential direction. Also, a maximum distance L1o in the tire circumferential direction between the outer maximum amplitude position P1oo and an inner maximum amplitude position P1oi in the outer edge portion 211*o* of the groove opening portion 211 preferably has the relationship $0.50 \leq L1o/\lambda 1o \leq 0.60$ to the wavelength $\lambda 1o$ of the zigzag shape of the outer edge portion 211*o*, and more preferably has the relationship $0.50 \leq L1o/\lambda 1o \leq 0.55$. This makes the rigidity of the tread contact surface of a new tire uniform in the tire circumferential direction.

The maximum distance in the tire circumferential direction between the outer maximum amplitude position and the inner maximum amplitude position is measured as a greater distance among distances in the tire circumferential direction between the adjacent outer maximum amplitude positions and the inner maximum amplitude position disposed between the outer maximum amplitude positions.

Meanwhile, the groove bottom portion 212 in the shoulder main groove 21 has the zigzag shape formed by alternately connecting long portions and short portions in the tire circumferential direction. Thus, the zigzag shape of the groove bottom portion 212 has a bent shape differing from the zigzag shape of the groove opening portion 211. As a result, the above-described offset amount $\varphi oo$ between the outer maximum amplitude positions P1oo, P2oo in the outer edge portions 211*o*, 212*o* of the groove opening portion 211 and the groove bottom portion 212 is formed. Also, a maximum distance L2o in the tire circumferential direction between the outer maximum amplitude position P2oo and an inner maximum amplitude position P2oi in the outer edge portion 212*o* of the groove bottom portion 212 preferably has the relationship $0.55 \leq L2o/\lambda 2o \leq 0.65$ to the wavelength $\lambda 2o$ of the zigzag shape of the outer edge portion 212*o*, and more preferably has the relationship $0.57 \leq L2o/\lambda 2o \leq 0.63$.

Also, the maximum distance L1o in the tire circumferential direction between the outer maximum amplitude position P1oo and the inner maximum amplitude position P1oi on the groove opening portion 211 in the shoulder main groove 21 preferably has the relationship $1.10 \leq L2o/L1o \leq 1.40$ to the maximum distance L2o in the tire circumferential direction between the outer maximum amplitude position P2oo and the inner maximum amplitude position P2oi in the groove bottom portion 212, and more preferably has the relationship $1.20 \leq L2o/L1o \leq 1.30$. Accordingly, the maximum distance L2o between the maximum amplitude positions P2oo, P2oi on the groove bottom portion 212 is set greater than the maximum distance L1o between the maximum amplitude positions P1oo, P1oi on the groove opening portion 211. For example, in the configuration of FIG. 3, as described above, the wavelengths $\lambda 1o$, $\lambda 2o$ of the groove opening portion 211 and the groove bottom portion 212 are set to be substantially identical. Meanwhile, the groove bottom portion 212 in the shoulder main groove 21 has the zigzag shape formed by alternately connecting the long portions and the short portions in the tire circumferential direction so that the ratio L2o/L1o is set within the range described above.

As illustrated in FIG. 3, the offset amount $\varphi oo$ between the outer maximum amplitude positions P1oo, P2oo in the outer edge portions 211*o*, 212*o* of the groove opening portion 211 and the groove bottom portion 212 in the shoulder main groove 21 has the relationship $\varphi oi < \varphi oo$ to an offset amount $\varphi oi$ between the inner maximum amplitude positions P1oi, P2oi. In other words, while the bent portions of the zigzag shapes of the groove opening portion 211 and the groove bottom portion 212 are greatly offset at the outer maximum amplitude positions P1oo, P2oo to the outer side in the tire width direction, the bent portions are disposed to be aligned at the inner maximum amplitude positions P1oi, P2oi to the inner side in the tire width direction. As a result, the above-described ratio L2o/L1o is ensured. A difference between the offset amounts $\varphi oo$, $\varphi oi$, which is $\varphi oo-\varphi oi$, is not particularly limited, but is subject to restrictions by other conditions, such as the ratios L1o/$\lambda$1o and L2o/L1o described above. Additionally, the offset amount $\varphi oi$ may be $\varphi oi=0$.

Additionally, in FIG. 4, a groove wall angle $\alpha 1oo$ at the outer maximum amplitude position P1oo of the outer edge portion 211*o* of the groove opening portion 211 in the shoulder main groove 21 has the relationship $\alpha 2oo < \alpha 1oo$ to a groove wall angle $\alpha 2oo$ at the outer maximum amplitude position P2oo of the outer edge portion 212*o* of the groove bottom portion 212. In this manner, the groove wall angles $\alpha 1oo$, $\alpha 2oo$ of the shoulder main groove 21 sterically change in the tire circumferential direction caused by the offset between the outer maximum amplitude positions P1oo, P2oo of the groove opening portion 211 and the groove bottom portion 212 described above. As a result, stone trapping of the shoulder main groove 21 is effectively suppressed.

Similarly, in FIG. 5, groove wall angles α1oo, α1oi at the outer maximum amplitude position P1oo and the inner maximum amplitude position P1oi of the outer edge portion 211o of the groove opening portion 211 in the shoulder main groove 21 have the relationship α1oo<α1oi. In this manner, the groove wall angles α1oo, α1oi of the shoulder main groove 21 sterically change in the tire circumferential direction caused by the amplitude A2o of the zigzag shape of the groove bottom portion 212 being greater than the amplitude A1o of the zigzag shape of the groove opening portion 211. As a result, the stone trapping of the shoulder main groove 21 is effectively suppressed.

Additionally, in FIG. 4, a maximum width Wg2 of the groove bottom portion 212 in the shoulder main groove 21 preferably has the relationship 0≤Wg2/Wg1≤0.60 to a maximum width Wg1 of the groove opening portion 211 (that is, the groove width of the shoulder main groove 21), and more preferably has the relationship 0.35≤Wg2/Wg1≤0.45.

Inner Edge Portion of Shoulder Main Groove

Figure 6:
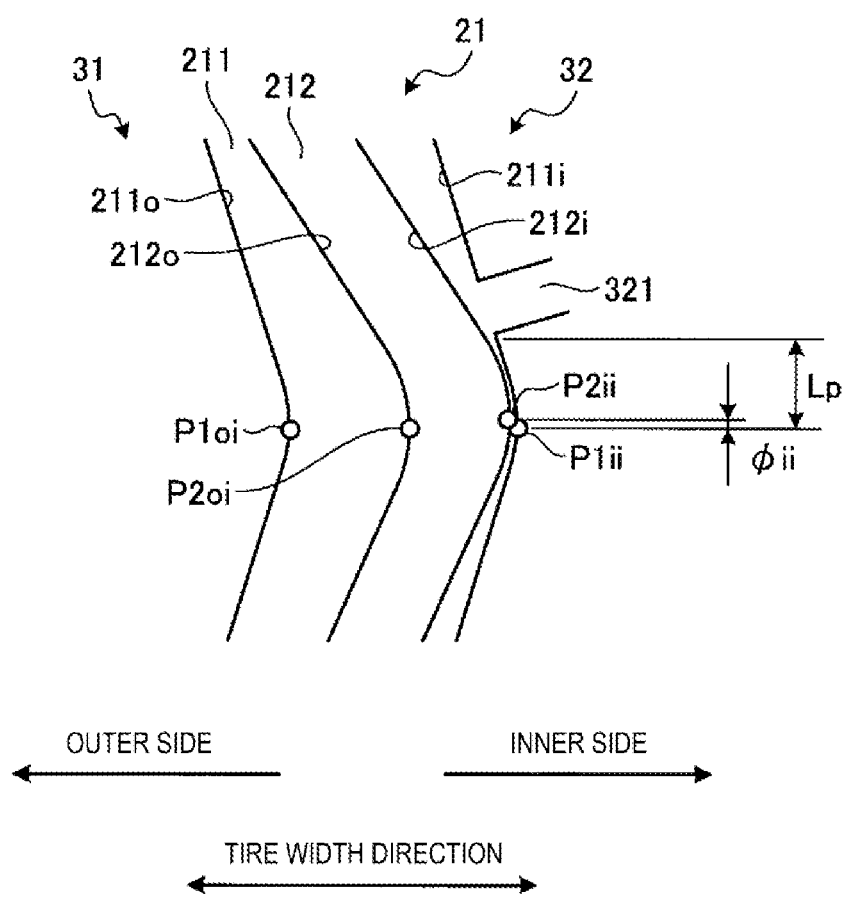
FIG. 6 is an explanatory diagram illustrating an inner edge portion of a shoulder main groove illustrated in FIG. 3.

FIG. 6 is an explanatory diagram illustrating the inner edge portion of the shoulder main groove 21 illustrated in FIG. 3. The identical drawing illustrates an enlarged view of maximum amplitude positions of the zigzag shape of the shoulder main groove 21 to the inner side in the tire width direction.

In the configuration of FIG. 3, as described above, the outer maximum amplitude position P1oo of the outer edge portion 211o of the groove opening portion 211 is disposed to be offset in the tire circumferential direction with respect to the outer maximum amplitude position P2oo of the outer edge portion 212o of the groove bottom portion 212 on the groove wall on the outer side in the tire width direction of the shoulder main groove 21 having the zigzag shape. Additionally, the inner maximum amplitude positions P1oi, P2oi of the groove opening portion 211 and the groove bottom portion 212 are disposed with the positions in the tire circumferential direction aligned. The groove wall on the outer side in the tire width direction of the shoulder main groove 21 thus has the configuration described above. As a result, the tear of the shoulder land portion 31 is suppressed and the stone trapping of the shoulder main groove 21 is suppressed.

Also, in the configuration of FIG. 3, as illustrated in FIG. 6, an inner maximum amplitude position P1ii of the inner edge portion 211i of the groove opening portion 211 is disposed with the position in the tire circumferential direction aligned with an inner maximum amplitude position P2ii of the inner edge portion 212i of the groove bottom portion 212 on the groove wall in the inner side in the tire width direction of the shoulder main groove 21. In this manner, at the bent position of the shoulder main groove 21 to the inner side in the tire width direction, the maximum amplitude positions P1ii, P2ii of the groove opening portion 211 and of the groove bottom portion 212 are disposed with the positions in the tire circumferential direction aligned. Additionally, an offset amount φii between the inner maximum amplitude positions P1ii, P2ii of the groove opening portion 211 and the groove bottom portion 212 may be φii=0.

Additionally, in the configuration of FIG. 2, the second land portion 32 includes the lug grooves 321 as described above. The lug grooves 321 are narrow shallow grooves, and penetrate the second land portion 32 in the tire width direction to open to the shoulder main groove 21. Additionally, a groove width W21 (see FIG. 3) of the lug groove 321 preferably has the relationship 0.02≤W21/Pa≤0.10 to the pitch length Pa (see FIG. 2) of the lug grooves 321, and more preferably has the relationship 0.04≤W21/Pa≤0.06. Additionally, a groove depth H21 (see FIG. 5) of the lug groove 321 preferably has the relationship 0.10≤H21/Hg1≤0.50 to a groove depth Hg1 of the shoulder main groove 21, and more preferably has the relationship 0.15≤H21/Hg1≤0.28.

Also, as illustrated in FIG. 2, the opening portions of the lug grooves 321 to the shoulder main groove 21 are disposed to be offset in the tire circumferential direction with respect to the bent portions of the zigzag shapes of the main grooves 21, 22. Additionally, a maximum distance Lp (see FIG. 6) in the tire circumferential direction between the opening portion of the lug groove 321 and the inner maximum amplitude position P1ii of the groove opening portion 211 in the shoulder main groove 21 is preferably in the range 0.03≤Lp/Pa≤0.15 to the pitch length Pa (see FIG. 2) of the lug grooves 321, and more preferably in the range 0.04≤Lp/Pa≤0.08.

Groove Wall Structure of Center Main Groove

Figure 7:
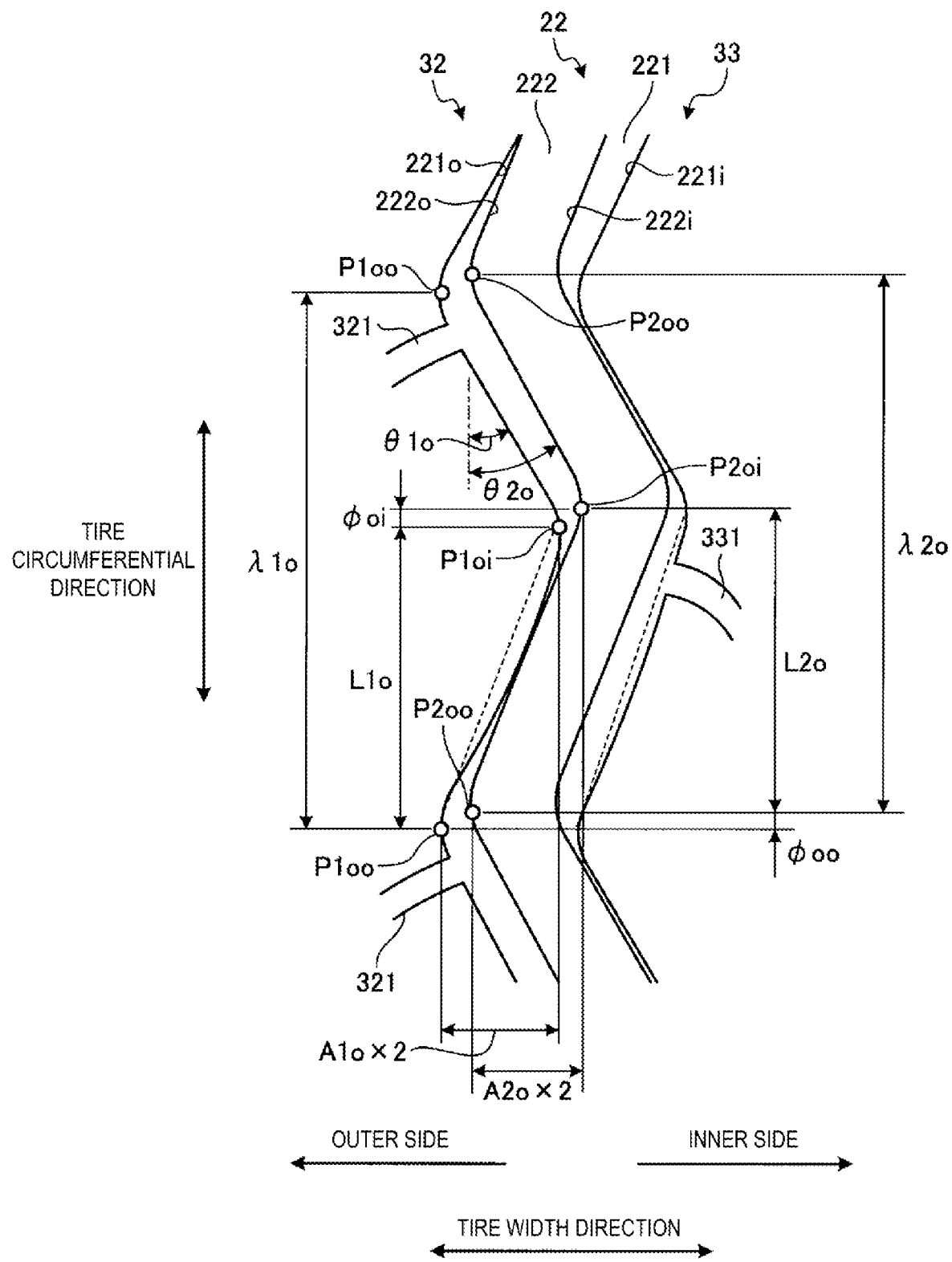
FIG. 7 is an explanatory diagram illustrating a groove wall structure of the circumferential main groove illustrated in FIG. 2.

FIG. 7 is an explanatory diagram illustrating the groove wall structure of the circumferential main groove illustrated in FIG. 2. The identical drawing illustrates an enlarged view of the center main groove 22.

In the configuration of FIG. 2, as shown by the comparison between FIGS. 3 and 7, the groove wall structure of the shoulder main groove 21 slightly differs from the groove wall structure of the center main groove 22. However, the configuration is not limited thereto, and the groove wall structure of the shoulder main groove 21 may have the structure identical to the groove wall structure of the center main groove 22. Here, the groove wall structure of the center main groove 22 will be described mainly about differences from the groove wall structure of the shoulder main grooves 21, and description of common points will be omitted.

In the configuration in FIG. 7, a groove opening portion 221 in the center main groove 22 has a zigzag shape with an amplitude in the tire width direction at respective outer edge portion 221o on the second land portion 32 side and inner edge portion 221i on the center land portion 33 side. Furthermore, a groove bottom portion 222 in the center main groove 22 has a zigzag shape with an amplitude in the tire width direction at respective outer edge portion 222o on the second land portion 32 side and inner edge portion 222i on the center land portion 33 side.

Additionally, in the configuration of FIG. 7, the edge portions 221o, 221i, 222o, and 222i of the groove opening portion 221 and the groove bottom portion 222 in the center main groove 22 have zigzag shapes formed by alternately connecting long portions and short portions in the tire circumferential direction. The edge portions 221o, 221i of the groove opening portion 221 have long portions having an arc shape projecting to the inner side in the tire width direction (see the imaginary lines in the drawing) and the short portions having a linear shape. Additionally, both of the long portions and the short portions of the edge portions 222o, 222i of the groove bottom portion 222 have a linear shape.

Additionally, the outer maximum amplitude position P1oo of the outer edge portion 221o of the groove opening portion 221 in the center main groove 22 is disposed to be offset in the tire circumferential direction with respect to the outer maximum amplitude position P2oo of the outer edge portion 222o of the groove bottom portion 222. In other words, in the groove wall on the second land portion 32 side of the center main groove 22, the zigzag shape of the outer edge portion 221o of the groove opening portion 221 and the zigzag shape of the outer edge portion 222o of the groove bottom portion 222 are disposed with phases shifted from one another at the outer maximum amplitude positions P1oo, P2oo projecting to the outer side in the tire width direction.

Additionally, the offset amount φoo (see FIG. 7) between the outer maximum amplitude positions P1oo, P2oo in the outer edge portions 221o, 222o of the groove opening portion 221 and the groove bottom portion 222 in the center main groove 22 meets the condition of the ratio φoo/λ1o in the shoulder main groove 21 described above to the wavelength λ1o of the outer edge portion 221o of the groove opening portion 221. Note that the offset amount φoo of the shoulder main groove 21 in FIG. 3 is set to be greater than the offset amount φoo of the center main groove 22 in FIG. 7. As a result, the rigidity of the groove wall of the shoulder land portion 31 is sterically reinforced, and the occurrence of tears in the shoulder land portion 31 is effectively suppressed.

Furthermore, the wavelength λ1o of the outer edge portion 221o of the groove opening portion 221 in the center main groove 22 is set to be substantially identical to the wavelength λ2o of the outer edge portion 222o of the groove bottom portion 222. Specifically, the wavelength λ1o, λ2o of the groove opening portion 221 and the groove bottom portion 222 meet the condition of the ratio λ2o/λ1o in the shoulder main groove 21 described above.

Additionally, the amplitude A1o of the outer edge portion 221o of the groove opening portion 221 in the center main groove 22 meets the condition of the ratio A2o/A1o in the shoulder main groove 21 described above to the amplitude A2o of the outer edge portion 222o of the groove bottom portion 222. Note that the amplitude A1o of the shoulder main groove 21 in FIG. 3 is set to be smaller than the amplitude A1o of the center main groove 22 in FIG. 7. As a result, the ratio A2o/A1o of the shoulder main groove 21 is set to be greater than the ratio A2o/A1o of the center main groove 22. As a result, the rigidity of the groove wall of the shoulder land portion 31 is sterically reinforced, and the occurrence of tears in the shoulder land portion 31 is effectively suppressed.

Also, the maximum inclination angle θ1o of the outer edge portion 221o of the groove opening portion 221 in the center main groove 22 with respect to the tire circumferential direction is set to be substantially identical to the maximum inclination angle θ2o of the outer edge portion 222o of the groove bottom portion 222 with respect to the tire circumferential direction. Specifically, the maximum inclination angles θ1o, θ2o of the groove opening portion 221 and groove bottom portion 222 have the relationship $1.00 \leq \theta 2o/\theta 1o \leq 1.10$. Accordingly, the ratio θ2o/θ1o of the shoulder main groove 21 in FIG. 3 is set to be greater than the ratio θ2o/θ1o of the center main groove 22 in FIG. 7. As a result, the rigidity of the groove wall of the shoulder land portion 31 is sterically reinforced, and the occurrence of tears in the shoulder land portion 31 is effectively suppressed.

The maximum distance L1o in the tire circumferential direction between the outer maximum amplitude position P1oo and the inner maximum amplitude position P1oi in the outer edge portion 221o of the groove opening portion 221 in the center main groove 22 meets the condition of the ratio L1o/λ1o in the shoulder main groove 21 described above to the wavelength λ1o of the zigzag shape of the outer edge portion 221o. However, in the configuration of FIG. 7, as described above, the edge portions 221o, 221i of the groove opening portion 221 in the center main groove 22 have the zigzag shape formed by alternately connecting the long portions and the short portions in the tire circumferential direction. Accordingly, the ratio L1o/λ1o of the center main groove 22 in FIG. 7 is set to be greater than the ratio L1o/λ1o of the shoulder main groove 21 in FIG. 3. This improves the discharge property of a foreign material entering the center main groove 22.

The maximum distance L2o in the tire circumferential direction between the outer maximum amplitude position P2oo and the inner maximum amplitude position P2oi in the outer edge portion 222o of the groove bottom portion 222 in the center main groove 22 meets the condition of the ratio L2o/λ2o in the shoulder main groove 21 described above to the wavelength λ2o of the zigzag shape of the outer edge portion 222o. Note that in the configuration of FIG. 7 as well, as described above, the edge portions 222o, 222i of the groove bottom portion 222 in the center main groove 22 have the zigzag shape formed by alternately connecting the long portions and the short portions in the tire circumferential direction.

Additionally, in the configuration of FIG. 7, as a difference from the groove wall structure of the shoulder main groove 21 in FIG. 3, the maximum distance L1o in the tire circumferential direction between the outer maximum amplitude position P1oo and the inner maximum amplitude position P1oi on the groove opening portion 221 in the center main groove 22 is substantially identical to the maximum distance L2o in the tire circumferential direction between the outer maximum amplitude position P2oo and the inner maximum amplitude position P2oi on the groove bottom portion 222, and the ratio L2o/L1o has the relationship $1.00 \leq L2o/L1o \leq 1.10$. Additionally, as described above, the wavelength λ1o of the outer edge portion 221o of the groove opening portion 221 in the center main groove 22 is set to be substantially identical to the wavelength λ2o of the outer edge portion 222o of the groove bottom portion 222. Accordingly, the offset amount φoo between the outer maximum amplitude positions P1oo, P2oo of the center main groove 22 is substantially identical to the offset amount φoi between the inner maximum amplitude positions P1oi, P2oi. This improves the discharge property of a foreign material entering the center main groove 22.

Groove Center Line of Shoulder Main Groove

Figure 8:
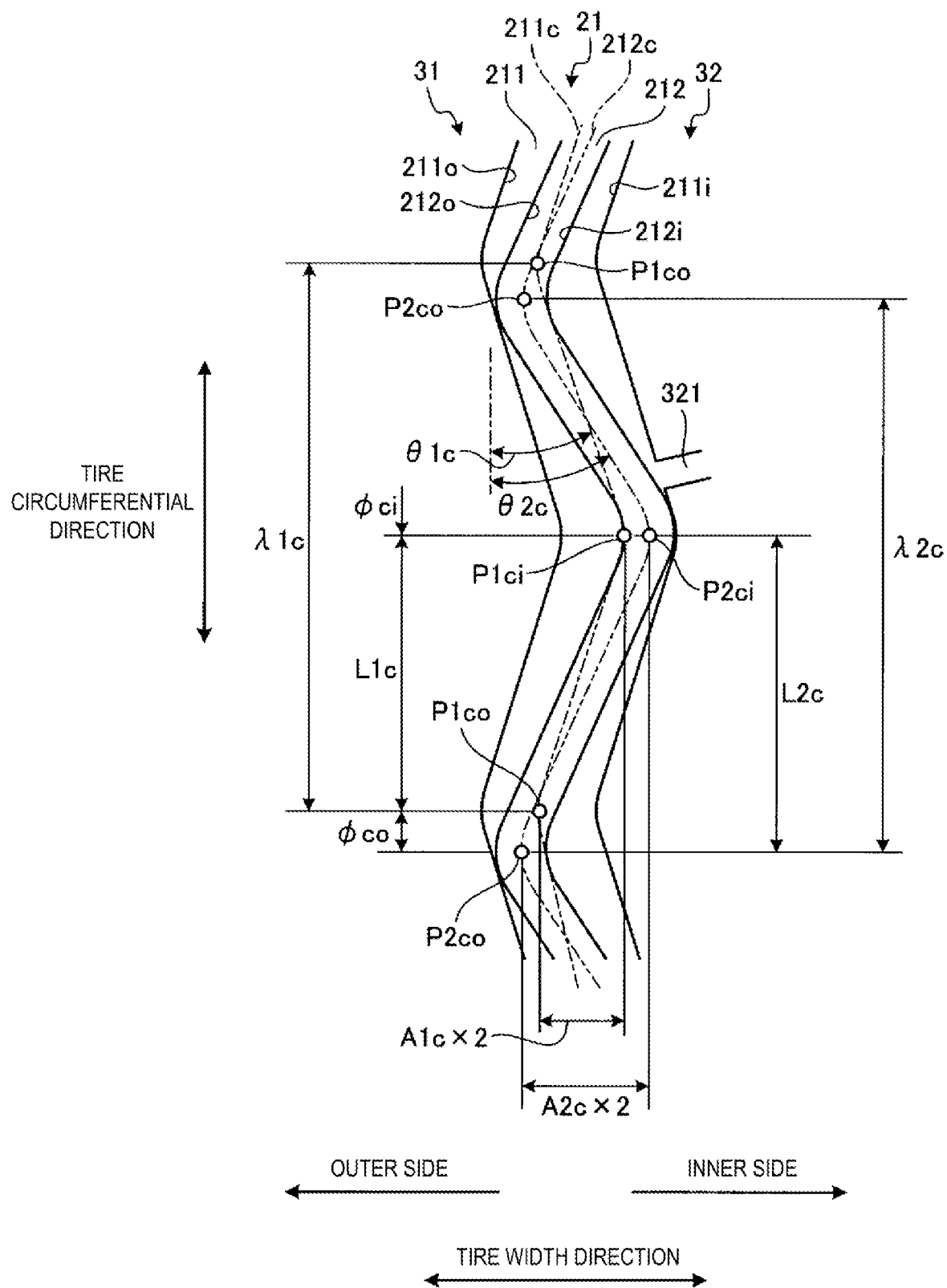
FIG. 8 is an explanatory diagram illustrating the shoulder main groove illustrated in FIG. 3.

FIG. 8 is an explanatory diagram illustrating the shoulder main groove 21 illustrated in FIG. 3. Reference signs and dimensional symbols in the identical drawing are changed from the reference signs and the dimensional symbols described in FIG. 3, and in particular, FIG. 8 illustrates a relationship between the center line of the groove opening portion 211 and the center line of the groove bottom portion 212 in the shoulder main groove 21.

As described above in FIG. 3, in the groove wall structure on the outer side in the tire width direction of the shoulder main groove 21 (that is, on the shoulder land portion 31 side), the zigzag shape of the outer edge portion 211o of the groove opening portion 211 and the zigzag shape of the outer edge portion 212o of the groove bottom portion 212 are offset in the tire circumferential direction at the maximum amplitude positions P1oo, P2oo in the outer side in the tire width direction.

In the configuration of FIG. 3, the groove opening portion 211 and the groove bottom portion 212 in the shoulder main groove 21 have constant widths, and the outer edge portions 211o, 212o, and the inner edge portions 211i, 212i of the groove opening portion 211 and the groove bottom portion 212 are substantially parallel. Accordingly, the feature regarding the groove wall structure on the outer side in the tire width direction of the shoulder main groove 21 described above is similarly established in the relationship between a center line 211c of the groove opening portion 211 and a center line 212c of the groove bottom portion 212 in the shoulder main groove 21 illustrated in FIG. 8.

Specifically, in FIG. 8, respective outer maximum amplitude positions P1co, P2co projecting to the outer side in the tire width direction and inner maximum amplitude positions P1ci, P2ci projecting to the inner side in the tire width direction are defined in the center lines 211c, 212c of the groove opening portion 211 and the groove bottom portion 212 in the shoulder main groove 21.

At this time, the outer maximum amplitude position P1co on the center line 211c of the groove opening portion 211 is disposed to be offset in the tire circumferential direction with respect to the outer maximum amplitude position P2co on the center line 212c of the groove bottom portion 212. This improves the tear resistance performance of the tire and improves the stone rejecting performance of the tire.

Also, an offset amount φco (see FIG. 8) between the outer maximum amplitude positions P1co, P2co on the center lines 211c, 212c of the groove opening portion 211 and the groove bottom portion 212 in the shoulder main groove 21 preferably has the relationship $0.03 \leq \varphi co/\lambda 1c \leq 0.45$ to a wavelength λ1c of the center line 211c of the groove opening portion 211, and more preferably has the relationship $0.10 \leq \varphi co/\lambda 1c \leq 0.25$. As a result, the offset amount φco between the outer maximum amplitude positions P1co, P2co is made appropriate.

Furthermore, the wavelength λ1c of the center line 211c of the groove opening portion 211 in the shoulder main groove 21 is set to be substantially identical to a wavelength λ2c of the center line 212c of the groove bottom portion 212. Specifically, the wavelengths λ1c, λ2c of the groove opening portion 211 and the groove bottom portion 212 are in a range $0.90 \leq \lambda 2c/\lambda 1c \leq 1.10$.

Additionally, the wavelength λ1c of the groove opening portion 211 in the shoulder main groove 21 is preferably in the range $0.90 \leq \lambda 1c/Pa \leq 1.10$ to the pitch length Pa (see FIG. 2) of the lug grooves 321 in the second land portion 32, and more preferably in the range $0.95 \leq \lambda 1c/Pa \leq 1.05$. Accordingly, the wavelength λ1c of the groove opening portion 211 is set to be substantially identical to the pitch length Pa of the lug grooves 321.

Additionally, an amplitude A1c of the center line 211c of the groove opening portion 211 in the shoulder main groove 21 preferably has the relationship $1.00 \leq A2c/A1c \leq 2.00$ to an amplitude A2c of the center line 212c of the groove bottom portion 212, and more preferably has the relationship $1.30 \leq A2c/A1c \leq 1.80$. Accordingly, the amplitude A2c of the zigzag shape of the groove bottom portion 212 is set to be equal to or more than the amplitude A1c of the zigzag shape of the groove opening portion 211.

Additionally, a maximum inclination angle θ1c of the center line 211c of the groove opening portion 211 in the shoulder main groove 21 with respect to the tire circumferential direction has the relationship θ1c<θ2c to a maximum inclination angle θ2c of the center line 212c of the groove bottom portion 212 with respect to the tire circumferential direction. That is, the maximum inclination angle θ2c of the groove bottom portion 212 is greater than the maximum inclination angle θ1c of the groove opening portion 211, and the inclination angle of the groove wall of the shoulder main groove 21 increases from the groove opening portion 211 to the groove bottom portion 212.

Additionally, the maximum inclination angles θ1c, θ2c of the groove opening portion 211 and the groove bottom portion 212 preferably have the relationship $1.50 \leq \theta 2c/\theta 1c \leq 2.00$. As a result, a ratio between the maximum inclination angles θ1c, θ2c of the groove opening portion 211 and the groove bottom portion 212, θ2c/θ1c, is made appropriate. A difference between the maximum inclination angles θ1c, θ2c, which is θ2c−θ1c, is preferably not less than 5 degrees.

Additionally, in the configuration of FIG. 8, the center line 211c of the groove opening portion 211 in the shoulder main groove 21 has the zigzag shape formed by connecting linear portions having a substantially identical length in the tire circumferential direction. Also, a maximum distance L1c in the tire circumferential direction between the outer maximum amplitude position P1co and the inner maximum amplitude position P1ci on the center line 211c of the groove opening portion 211 preferably has the relationship $0.50 \leq L1c/\lambda 1c \leq 0.60$ to the wavelength λ1c of the zigzag shape of the center line 211c, and more preferably has the relationship $0.50 \leq L1c/\lambda 1c \leq 0.55$. This makes the rigidity of the tread contact surface of a new tire uniform in the tire circumferential direction.

Meanwhile, the center line 212c of the groove bottom portion 212 in the shoulder main groove 21 has the zigzag shape formed by alternately connecting long portions and short portions in the tire circumferential direction. Thus, the zigzag shape of the groove bottom portion 212 has a bent shape differing from the zigzag shape of the groove opening portion 211. As a result, the above-described offset amount φco between the outer maximum amplitude positions P1co, P2co on the center lines 211c, 212c of the groove opening portion 211 and the groove bottom portion 212 is formed. Also, a maximum distance L2c in the tire circumferential direction between the outer maximum amplitude position P2co and the inner maximum amplitude position P2ci on the center line 212c of the groove bottom portion 212 preferably has the relationship $0.55 \leq L2c/\lambda 2c \leq 0.65$ to the wavelength λ2c of the zigzag shape of the center line 212c, and more preferably has the relationship $0.57 \leq L2c/\lambda 2c \leq 0.63$.

The maximum distance L1c in the tire circumferential direction between the outer maximum amplitude position P1co and the inner maximum amplitude position P1ci in the groove opening portion 211 in the shoulder main groove 21 preferably has the relationship $1.10 \leq L2c/L1c \leq 1.40$ to the maximum distance L2c in the tire circumferential direction between the outer maximum amplitude position P2co and the inner maximum amplitude position P2ci in the groove bottom portion 212, and more preferably has the relationship $1.20 \leq L2c/L1c \leq 1.30$. Accordingly, the maximum distance L2c between the maximum amplitude positions P2co, P2ci in the groove bottom portion 212 is set greater than the maximum distance L1c between the maximum amplitude positions P1co, P1ci in the groove opening portion 211. For example, in the configuration of FIG. 8, as described above, the wavelengths λ1c, λ2c of the groove opening portion 211 and the groove bottom portion 212 are set to be substantially identical. Moreover, the groove bottom portion 212 in the shoulder main groove 21 has the zigzag shape formed by alternately connecting the long portions and the short portions in the tire circumferential direction so that the ratio L2c/L1c is set within the range described above.

Also, as illustrated in FIG. 8, the offset amount φco between the outer maximum amplitude positions P1co, P2co on the center lines 211c, 212c of the groove opening portion 211 and the groove bottom portion 212 in the shoulder main groove 21 has the relationship φci<φco to the offset amount φci between the inner maximum amplitude positions P1ci, P2ci. In other words, while the bent portions having the zigzag shapes of the groove opening portion 211 and the groove bottom portion 212 are greatly offset at the outer maximum amplitude positions P1co, P2co in the outer side in the tire width direction, the bent portions are disposed with the positions aligned at the inner maximum amplitude positions P1ci, P2ci in the inner side in the tire width direction. As a result, the above-described ratio L2c/L1c is ensured. A difference between the offset amounts φco, φci, which is φco−φci, is not particularly limited, but is subject to restrictions by other conditions, such as the ratios L1c/λ1c and L2c/L1c described above. Additionally, the offset amount φci may be φci=0.

Groove Center Line of Center Main Groove

Figure 9:
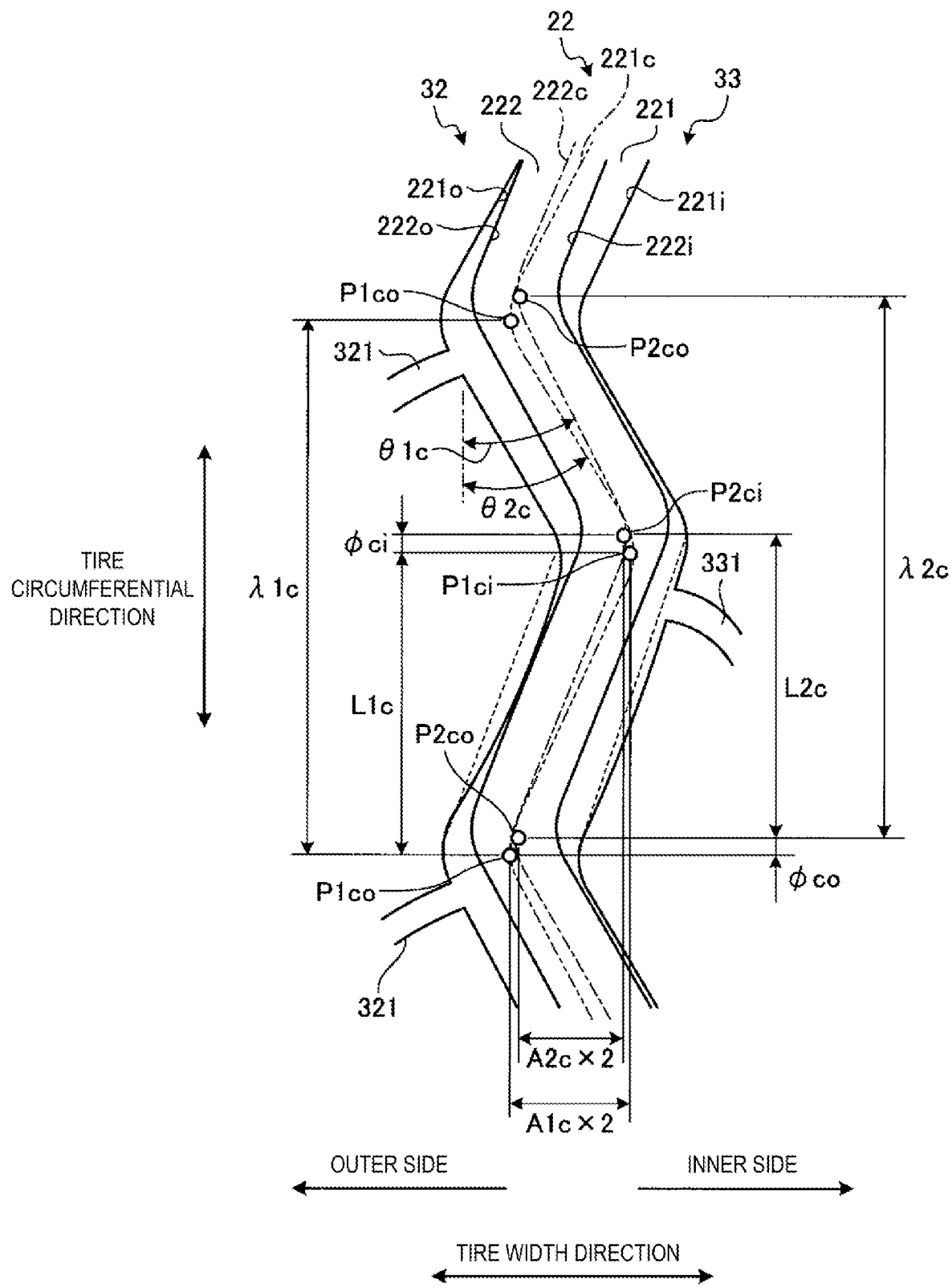
FIG. 9 is an explanatory diagram illustrating a center main groove illustrated in FIG. 7.

FIG. 9 is an explanatory diagram illustrating the center main groove 22 illustrated in FIG. 7. Reference signs and dimensional symbols in the identical drawing are changed from the reference signs and dimensional symbols described in FIG. 7, and in particular, FIG. 9 illustrates a relationship between the center line of the groove opening portion 221 and the center line of the groove bottom portion 222 in the center main groove 22.

In the configuration of FIG. 2, as shown by the comparison between FIGS. 8 and 9, the groove wall structure of the shoulder main groove 21 slightly differs from the groove wall structure of the center main groove 22. However, the configuration is not limited thereto, and the groove wall structure of the shoulder main groove 21 may have the structure identical to the groove wall structure of the center main groove 22. Here, the groove wall structure of the center main groove 22 will be described mainly about differences from the groove wall structure of the shoulder main grooves 21, and description of common points will be omitted.

As described above in FIG. 7, in the groove wall structure on the outer side in the tire width direction of the center main groove 22 (that is, on the second land portion 32 side), the zigzag shape of the outer edge portion 221o of the groove opening portion 221 and the zigzag shape of the outer edge portion 222o of the groove bottom portion 222 are offset in the tire circumferential direction at the maximum amplitude positions P1oo, P2oo in the outer side in the tire width direction.

In the configuration of FIG. 9, the groove opening portion 221 and the groove bottom portion 222 in the center main groove 22 have constant widths, and the outer edge portions 221o, 222o, and the inner edge portions 221i, 222i in the groove opening portion 221 and the groove bottom portion 222 are substantially parallel. Accordingly, the feature regarding the groove wall structure on the outer side in the tire width direction of the shoulder main groove 21 described above is similarly established in the relationship between a center line 221c of the groove opening portion 221 and a center line 222c of the groove bottom portion 222 in the center main groove 22 illustrated in FIG. 9.

Specifically, in FIG. 9, the respective outer maximum amplitude positions P1co, P2co projecting to the outer side in the tire width direction and inner maximum amplitude positions P1ci, P2ci projecting to the inner side in the tire width direction are defined at the center lines 221c, 222c of the groove opening portion 221 and the groove bottom portion 222 in the center main groove 22.

At this time, the outer maximum amplitude position P1co of the center line 221c of the groove opening portion 221 is disposed to be offset in the tire circumferential direction with respect to the outer maximum amplitude position P2co of the center line 222c of the groove bottom portion 222. This improves the tear resistance performance of the tire and improves the stone rejecting performance of the tire.

Additionally, the offset amount φco (see FIG. 9) between the outer maximum amplitude positions P1co, P2co on the center lines 221c, 222c of the groove opening portion 221 and the groove bottom portion 222 in the center main groove 22 meets the condition of the ratio φco/λ1c in the shoulder main groove 21 described above to the wavelength λ1c of the center line 221c of the groove opening portion 221. Note that the offset amount φco in the shoulder main groove 21 in FIG. 8 is set greater than the offset amount φco in the center main groove 22 in FIG. 9. As a result, the rigidity of the groove wall of the shoulder land portion 31 is sterically reinforced, and the occurrence of tears in the shoulder land portion 31 is effectively suppressed.

Furthermore, the wavelength λ1c of the center line 221c of the groove opening portion 221 in the center main groove 22 is set to be substantially identical to the wavelength λ2c of the center line 222c of the groove bottom portion 222. Specifically, the wavelength λ1c, λ2c of the groove opening portion 221 and the groove bottom portion 222 meet the condition of the ratio λ2c/λ1c in the shoulder main groove 21 described above.

The wavelength λ1c of the groove opening portion 221 in the center main groove 22 meets the condition of the ratio λ1c/Pa in the shoulder main groove 21 described above to the pitch length Pa (see FIG. 2) of the lug grooves 321 in the second land portion 32.

Additionally, the amplitude A1c of the center line 221c of the groove opening portion 221 in the center main groove 22 meets the condition of the ratio A2c/A1c in the shoulder main groove 21 described above to the amplitude A2c of the center line 222c of the groove bottom portion 222. Note that the amplitude A1c of the shoulder main groove 21 in FIG. 8 is set to be smaller than the amplitude A1c of the center main groove 22 in FIG. 9. As a result, the ratio A2c/A1c of the shoulder main groove 21 is set to be greater than the ratio A2c/A1c of the center main groove 22. As a result, the rigidity of the groove wall of the shoulder land portion 31 is sterically reinforced, and the occurrence of tears in the shoulder land portion 31 is effectively suppressed.

Also, the maximum inclination angle θ1c of the center line 221c of the groove opening portion 221 in the center main groove 22 with respect to the tire circumferential direction is set to be substantially identical to the maximum inclination angle θ2c of the center line 222c of the groove bottom portion 222 with respect to the tire circumferential direction. Specifically, the maximum inclination angles θ1c, θ2c of the groove opening portion 221 and groove bottom portion 222 have the relationship 1.00 degrees≤θ2c/θ1c≤1.10 degrees. Accordingly, the ratio θ2c/θ1c in the shoulder main groove 21 in FIG. 8 is set to be greater than the ratio θ2c/θ1c in the center main groove 22 in FIG. 9. As a result, the rigidity of the groove wall of the shoulder land portion 31 is sterically reinforced, and the occurrence of tears in the shoulder land portion 31 is effectively suppressed.

Also, the maximum distance L1c in the tire circumferential direction between the outer maximum amplitude position P1oo and the inner maximum amplitude position P1oi on the center line 221c of the groove opening portion 221 in the center main groove 22 meets the condition of the ratio L1c/λ1c in the shoulder main groove 21 described above to the wavelength λ1c of the zigzag shape of the center line 221c. However, in the configuration of FIG. 9, as described above, the center line 221c of the groove opening portion 221 in the center main groove 22 has a zigzag shape formed by alternately connecting long portions and short portions in the tire circumferential direction.

Accordingly, the ratio L1c/λ1c in the center main groove 22 in FIG. 9 is set to be greater than the ratio L1c/λ1c in the shoulder main groove 21 in FIG. 8. This improves the discharge property of a foreign material entering the center main groove 22.

The maximum distance L2c in the tire circumferential direction between the outer maximum amplitude position P2co and the inner maximum amplitude position P2ci on the center line 222c of the groove bottom portion 222 in the center main groove 22 meets the condition of the ratio L2c/λ2c in the shoulder main groove 21 described above to the wavelength λ2c of the zigzag shape of the center line 222c. Note that in the configuration of FIG. 9 as well, as described above, the center line 222c of the groove bottom portion 222 in the center main groove 22 has a zigzag shape formed by alternately connecting long portions and short portions in the tire circumferential direction.

Additionally, in the configuration of FIG. 9, as a difference from the groove wall structure of the shoulder main groove 21 in FIG. 8, the maximum distance L1c in the tire circumferential direction between the outer maximum amplitude position P1co and the inner maximum amplitude position P2ci of the groove opening portion 221 in the center main groove 22 is substantially identical to the maximum distance L2c in the tire circumferential direction between the outer maximum amplitude position P2co and the inner maximum amplitude position P2ci of the groove bottom portion 222, and the ratio L2c/L1c has the relationship 1.00≤L2c/L1c≤1.10. Additionally, as described above, the wavelength λ1o of the groove opening portion 221 in the center main groove 22 is set to be substantially identical to the wavelength λ2o of the groove bottom portion 222. Accordingly, the offset amount φco between the outer maximum amplitude positions P1co, P2co of the center main groove 22 is substantially identical to the offset amount φci between the inner maximum amplitude positions P1ci, P2ci. This improves the discharge property of a foreign material entering the center main groove 22.

Figure 10:
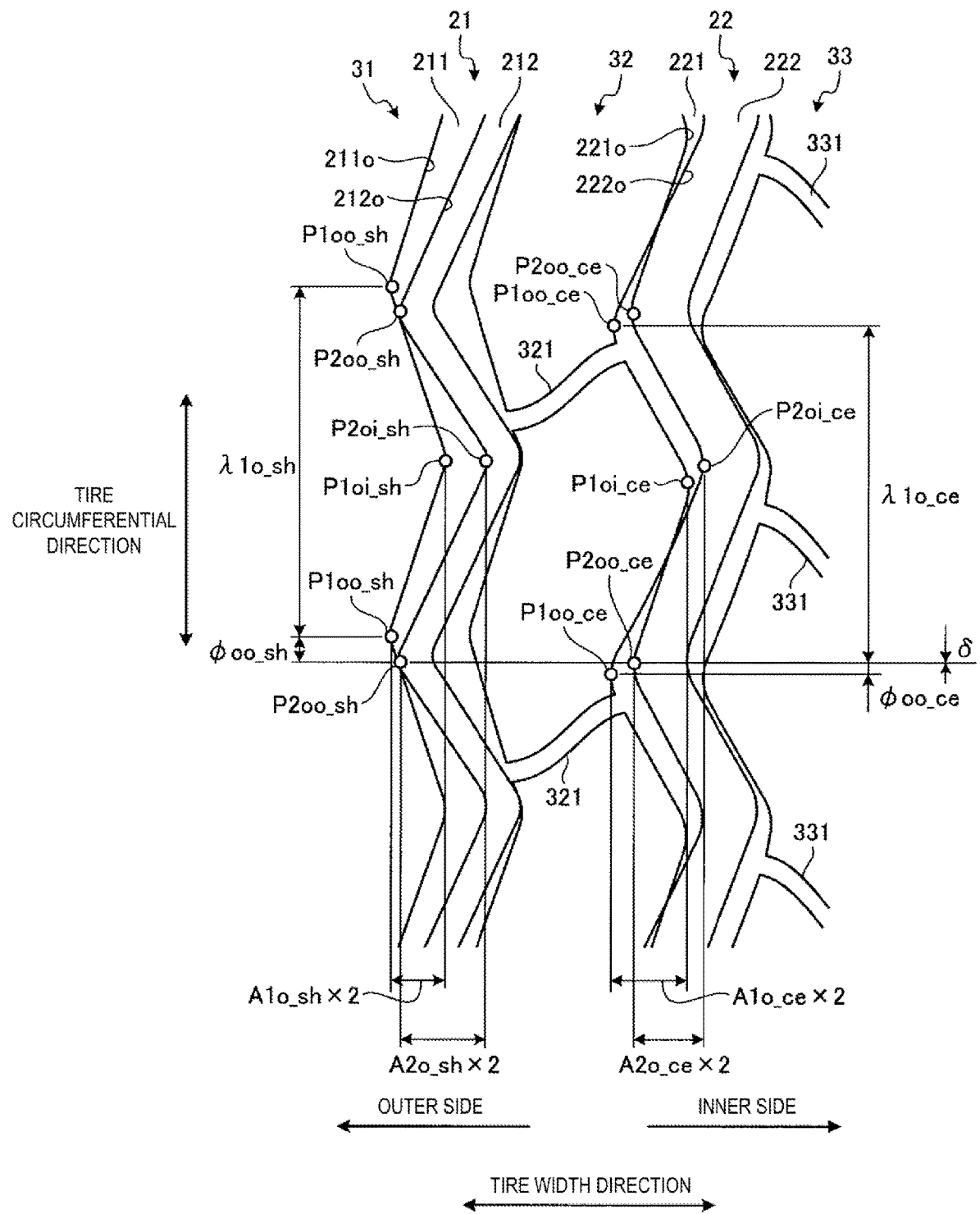
FIG. 10 is an enlarged view illustrating the shoulder main groove and the center main groove illustrated in FIG. 2.

Displacement Amount between Groove Bottom Portions of Main Grooves Adjacent to One Another FIG. 10 is an enlarged view illustrating the shoulder main groove 21 and the center main groove 22 illustrated in FIG. 2. In the description of the identical drawing, "_sh" is given to the dimensions and the reference signs of the shoulder main groove 21 in FIG. 3 and "_ce" is given to the dimensions and reference signs of the center main groove 22 in FIG. 7 for distinction of both.

In FIG. 10, as described above, at outer edge portions in the tire width direction in the shoulder main groove 21 and the center main groove 22, outer maximum amplitude position P1oo_sh, P1oo_ce of the groove opening portions 211, 221 are offset in the tire circumferential direction with respect to outer maximum amplitude positions P2oo_sh, P2oo_ce of the groove bottom portions 212, 222, and offset amounts φoo_sh, φoo_ce of them are set to be not less than 3% to wavelengths λ1o_sh, λ1o_ce of the outer edge portions 211o, 221o of the groove opening portions 211, 221.

At this time, a displacement amount δ in the tire circumferential direction between the outer maximum amplitude position P2oo_sh of the groove bottom portion 212 in the shoulder main groove 21 and the outer maximum amplitude position P2oo_ce of the groove bottom portion 222 in the center main groove 22 adjacent to the shoulder main groove 21 preferably has the relationship 0≤δ/λ1o_sh≤0.03 to the wavelength λ1o_sh of the groove opening portion 211 in the shoulder main groove 21, and more preferably has the relationship 0≤δ/λ1o_sh≤0.015. In other words, the outer maximum amplitude positions P2oo_sh, P2oo_ce of the groove bottom portions 212, 222 in the pair of adjacent circumferential main grooves 21, 22 are disposed with the positions in the tire circumferential direction aligned.

The displacement amount δ is measured as a distance in the tire circumferential direction between the maximum amplitude position of a first circumferential main groove and the maximum amplitude position of an adjacent second circumferential main groove.

Additionally, the displacement amount δ between the outer maximum amplitude positions P2oo_sh, P2oo_ce of the groove bottom portions 212, 222 described above is preferably within the above-described range in a circumferential region not less than 3% in the tire ground contact surface. Accordingly, it is sufficient that the displacement amount δ is within the above-described range in most of the region in the tire ground contact surface, and the displacement amount δ between the outer maximum amplitude positions P2oo_sh, P2oo_ce may partially exceed the above-described range (not illustrated).

For example, in the configuration of FIG. 10, a wavelength λ2o_sh of the groove bottom portion 212 in the shoulder main groove 21 and a wavelength λ2o_ce (not illustrated) of the groove bottom portion 222 in the center main groove 22 in the identical pitch of the tread pattern are set to be substantially identical on the entire circumference of the tire. Specifically, the wavelengths λ2o_sh, λ2o_ce of the shoulder main groove 21 and the center main groove 22 are in the range 0.95≤λ2o_sh/λ2o_ce≤1.05. As a result, the outer maximum amplitude positions P2oo_sh, P2oo_ce of the groove bottom portions 212, 222 in the shoulder main groove 21 and the center main groove 22 are disposed with the positions in the tire circumferential direction aligned.

In the configuration described above, the groove opening portions 211, 221 and the groove bottom portions 212, 222 are mutually offset in the tire circumferential direction at the outer edge portions 211o, 221o in the tire width direction in the circumferential main grooves 21, 22. Accordingly, as described above, the rigidity of the land portions 31, 32 defined by the outer edge portions in the circumferential main grooves 21, 22 is reinforced, and the tear of the land portions 31, 32 is suppressed. At the same time, since the outer maximum amplitude positions P2oo_sh and P2oo_ce of the groove bottom portions 212, 222 in the adjacent circumferential main grooves 21, 22 are disposed with the positions in the tire circumferential direction aligned, the rigidity of the land portions 31, 32 is made uniform, and uneven wear of the land portions 31, 32 (in particular, heel and toe wear of the land portion 32 including the lug grooves 321) is suppressed. Thus, tear resistance performance can be improved with the uneven wear resistance performance of the tire maintained.

Additionally, in FIG. 10, the offset amount φoo_sh between the groove opening portion 211 and the groove bottom portion 212 in the shoulder main groove 21 has the relationship φoo_ce<φoo_sh to the offset amount φoo_ce between the groove opening portion 221 and the groove bottom portion 222 in the center main groove 22. In other words, the offset amount φoo_sh of the shoulder main groove 21 is set greater than the offset amount φoo_ce of the center main groove 22. Additionally, the offset amounts φoo_sh, φoo_ce are preferably in the range 0<(φoo_ce-sh-φoo_ce)/λ1o_sh≤0.050 to the wavelength λ1o_sh of the groove opening portion 211 in the shoulder main groove 21, and more preferably in the range $0.025 \leq (\varphi oo\_sh - \varphi oo\_ce)/\lambda 1o\_sh \leq 0.035$. Thus, the rigidity of the shoulder land portion 31 in which a tear is likely to occur is relatively reinforced, and the effect of improving the tear resistance performance described above can be efficiently obtained.

Additionally, in FIG. 10, an amplitude A1o_sh of the outer edge portion 211o of the groove opening portion 211 in the shoulder main groove 21 preferably has the relationship $0.40 \leq A1o\_sh/A1o\_ce \leq 0.80$ to an amplitude A1o_ce of the outer edge portion 221o of the groove opening portion 221 in the center main groove 22, and more preferably has the relationship $0.60 \leq A1o\_sh/A1o\_ce \leq 0.70$. Accordingly, the amplitude A1o_sh of the groove opening portion 211 in the shoulder main groove 21 is set to be smaller than the amplitude A1o_ce of the center main groove 22. Thus, the rigidity of the shoulder land portion 31 is relatively reinforced.

Additionally, in FIG. 10, an amplitude A2o_sh of the outer edge portion 212o of the groove bottom portion 212 in the shoulder main groove 21 preferably has the relationship $0.80 \leq A2o\_sh/A2o\_ce \leq 1.50$ to an amplitude A2o_ce of the outer edge portion 222o of the groove bottom portion 222 in the center main groove 22, and more preferably has the relationship $1.10 \leq A2o\_sh/A2o\_ce \leq 1.30$. Accordingly, the amplitude A2o_sh of the groove bottom portion 212 in the shoulder main groove 21 is set to be greater than the amplitude A2o_ce of the center main groove 22. Thus, the rigidity of the shoulder land portion 31 is relatively reinforced.

Also, a maximum inclination angle θ1o_sh (see the angle θ1o in FIG. 3) of the outer edge portion 211o of the groove opening portion 211 in the shoulder main groove 21 preferably has the relationship $0.40 \leq \theta 1o\_sh/\theta 1o\_ce \leq 1.00$ to a maximum inclination angle θ1o_ce (see the angle θ1o in FIG. 7) of the groove opening portion 221 of the outer edge portion 221o in the center main groove 22, and more preferably has the relationship $0.50 \leq \theta 1o\_sh/\theta 1o\_ce \leq 0.80$. Accordingly, the maximum inclination angle θ1o_sh of the groove opening portion 211 in the shoulder main groove 21 is set to be smaller than the maximum inclination angle θ1o_ce of the center main groove 22. Thus, the rigidity of the shoulder land portion 31 is relatively reinforced.

Also, a maximum inclination angle θ2o_sh (see the angle θ2o in FIG. 3) of the outer edge portion 212o of the groove bottom portion 212 in the shoulder main groove 21 preferably has the relationship $1.00 < \theta 2o\_sh/\theta 2o\_ce \leq 1.50$ to a maximum inclination angle θ2o_ce (see the angle θ2o in FIG. 7) of the outer edge portion 222o of the groove bottom portion 222 in the center main groove 22, and more preferably has the relationship $1.05 \leq \theta 2o\_sh/\theta 2o\_ce \leq 1.80$. Accordingly, the maximum inclination angle θ2o_sh of the groove bottom portion 212 in the shoulder main groove 21 is set to be greater than the maximum inclination angle θ2o_ce of the center main groove 22. Thus, the rigidity of the shoulder land portion 31 is relatively reinforced.

Also, a maximum distance L1o_sh (see the distance L1o in FIG. 3) in the tire circumferential direction between the outer maximum amplitude position P1oo_sh and the inner maximum amplitude position P1oi_sh in the outer edge portion 211o of the groove opening portion 211 in the shoulder main groove 21 preferably has the relationship $0.60 \leq L1o\_sh/L1oi\_ce \leq 1.10$ to a maximum distance L1o_ce in the tire circumferential direction between the outer maximum amplitude position P1oo_ce and the inner maximum amplitude position P1oi_ce (see the distance L1o in FIG. 7) in the outer edge portion 221o of the groove opening portion 221 in the center main groove 22, and more preferably has the relationship $0.80 \leq L1o\_sh/L1oi\_ce \leq 0.90$.

Also, a maximum distance L2o_sh (see the distance L2o in FIG. 3) in the tire circumferential direction between the outer maximum amplitude position P2oo_sh and the inner maximum amplitude position P2oi_sh in the outer edge portion 212o of the groove bottom portion 212 in the shoulder main groove 21 preferably has the relationship $0.80 \leq L2o\_sh/L2oi\_ce \leq 1.20$ to a maximum distance L2o_ce (see the distance L2o in FIG. 7) in the tire circumferential direction between the outer maximum amplitude position P2oo_ce and the inner maximum amplitude position P2oi_ce in the outer edge portion 222o of the groove bottom portion 222 in the center main groove 22, and more preferably has the relationship $0.90 \leq L2o\_sh/L2oi\_ce \leq 1.00$.

Additionally, a maximum width Wg1_sh (see the width Wg1 in FIG. 4) of the groove opening portion 211 in the shoulder main groove 21 preferably has the relationship $0.65 \leq Wg1\_sh/Wg1\_ce \leq 1.00$ to a maximum width Wg1_ce of the groove opening portion 221 in the center main groove 22, and more preferably has the relationship $0.80 \leq Wg1\_sh/Wg1\_ce \leq 1.00$. Accordingly, the maximum width Wg1_sh of the groove opening portion 211 in the shoulder main groove 21 is set to be relatively small. Thus, the rigidity of the shoulder land portion 31 is relatively reinforced.

Additionally, a maximum width Wg2_sh (see the width Wg2 in FIG. 4) of the groove bottom portion 212 in the shoulder main groove 21 preferably has the relationship $0.55 \leq Wg2\_sh/Wg2\_ce \leq 0.75$ to a maximum width Wg2_ce of the groove bottom portion 222 in the center main groove 22, and more preferably has the relationship $0.55 \leq Wg2\_sh/Wg2\_ce \leq 0.65$. Accordingly, the maximum width Wg2_sh of the groove bottom portion 212 in the shoulder main groove 21 is set to be relatively small. Thus, the rigidity of the shoulder land portion 31 is relatively reinforced.

MODIFIED EXAMPLES

In the configuration of FIG. 10, as described above, the outer maximum amplitude positions P1oo_sh, P1oo_ce of the groove opening portions 211, 221 at the outer edge portions 211o, 212o, 221o, 222o in the tire width direction in the shoulder main groove 21 and the center main groove 22 are offset by the predetermined offset amounts φoo_sh, φoo_ce in the tire circumferential direction with respect to the outer maximum amplitude positions P2oo_sh, P2oo_ce of the groove bottom portions 212, 222.

However, no such limitation is intended, the groove opening portions 211; 221 may be offset with respect to the groove bottom portions 212; 222 at the outer edge portions 211o, 212o; 221o, 222o in any one of the shoulder main groove 21 and the center main groove 22, and the groove opening portion and the groove bottom portion need not to be offset at the outer edge portions in the other circumferential main groove (not illustrated). In such a configuration, at least the groove opening portion 211 in the shoulder main groove 21 is preferably offset with respect to the groove bottom portion 212. As a result, the rigidity of the shoulder land portion 31 in which a rib tear is especially likely to be generated is appropriately reinforced.

Additionally, the configuration of FIG. 2 includes the four circumferential main grooves 21, 22 having the zigzag shapes, and the respective groove opening portions 211, 221 and groove bottom portions 212, 222 in the circumferential main grooves 21, 22 are mutually offset. Thus, in the configuration that includes the three or more circumferential main grooves, it is preferred that the offset amounts φoo between the groove opening portions 211, 221 and the groove bottom portions 212, 222 meet the condition of the above-described ratio φoo/λ1o between all of the circumferential main grooves 21, 22, and a sum total Σδ of the displacement amounts δ of the groove bottom portions 212 has the relationship 0≤Σδ/λ1o≤0.03 to the wavelength λ1o of the groove opening portion 211 in the shoulder main groove 21.

Raised Bottom Portion in Groove Bottom

In the configuration of FIG. 2, either of the circumferential main grooves 21, 22 do not include the raised bottom portions in the groove bottom portions 212, 222.

However, no such limitation is intended, and all or a part of the circumferential main grooves 21, 22, especially the center main groove 22, preferably include the raised bottom portions in the groove bottom portions 212, 222 (not illustrated). The raised bottom portions have a structure in which the raised bottom portions project from the groove bottom portions 212, 222 to partially bottom up the groove bottom portions 212, 222. Also, a maximum height of the raised bottom portion starting from maximum groove depth positions of the circumferential main grooves 21, 22 is within a range of not less than 10% to not greater than 20% to the maximum groove depth Hg1 (see FIG. 5) of the circumferential main grooves 21, 22. In such a configuration, the raised bottom portions suppress entrapment of a foreign material into the circumferential main grooves 21, 22 and promote the discharge of the foreign material from the circumferential main grooves 21, 22. This improves stone rejecting characteristics of the tire.

Effects

As described above, the pneumatic tire 1 includes the circumferential main grooves 21 extending in the tire circumferential direction and the land portions 31, 32 defined by the circumferential main grooves 21 (see FIG. 2). Additionally, the groove opening portion 211 and the groove bottom portion 212 in the circumferential main groove 21 each have the zigzag shape or the wave-like shape with the amplitude in the tire width direction (see FIG. 3). Additionally, the outer maximum amplitude position P1oo of the outer edge portion 211o of the groove opening portion 211 is disposed to be offset in the tire circumferential direction with respect to the outer maximum amplitude position P2oo of the outer edge portion 212o of the corresponding groove bottom portion 212.

In the configuration described above, (1) the outer maximum amplitude position P2oo of the outer edge portion 212o of the groove bottom portion 212 in the shoulder main groove 21 is disposed to be offset in the tire circumferential direction with respect to the position where the ground contact width of the shoulder land portion 31 is minimized (that is, the outer maximum amplitude position P1oo of the groove opening portion 211 in the shoulder main groove 21). Thus, compared with a configuration (not illustrated) in which the outer maximum amplitude positions P1oo, P2oo of the groove opening portion 211 and the groove bottom portion 212 are at the identical position in the tire circumferential direction, the rigidity of the groove wall of the shoulder land portion 31 is sterically reinforced. This has an advantage that the tear of the shoulder land portions 31 is suppressed, and the tear resistance performance of the tire is improved.

Additionally, (2) since the outer maximum amplitude positions P1oo, P2oo of the groove opening portion 211 and the groove bottom portion 212 in the shoulder main groove 21 move in the tire circumferential direction toward the groove depth direction, compared with the configuration (not illustrated) in which the outer maximum amplitude positions P1oo, P2oo of the groove opening portion 211 and the groove bottom portion 212 are at the identical position in the tire circumferential direction, the entrance of a foreign material in the shoulder main grooves 21 is suppressed, and the discharge of a foreign material from the shoulder main groove 21 is promoted. Thus, there is an advantage that the stone rejecting performance of the tire is improved.

In the pneumatic tire 1, the offset amount φoo (see FIG. 3) between the outer maximum amplitude positions P1oo, P2oo in the outer edge portions 211o, 212o of the groove opening portion 211 and the groove bottom portion 212 has the relationship 0.03≤φoo/λ1o≤0.45 to the wavelength λ1o of the outer edge portion 211o of the groove opening portion 211 (see FIG. 3). This has an advantage that the offset amount φoo between the outer maximum amplitude positions P1oo, P2oo is made appropriate. In other words, the lower limit ensures the effect of improving the tear resistance performance and the stone rejecting performance of the tire brought by the offset between the outer maximum amplitude positions P1oo, P2oo. The upper limit ensures the amplitude A2o of the groove bottom portion 212, thereby ensuring the effect of improving stone rejecting performance.

In the pneumatic tire 1, the maximum inclination angle θ1o of the outer edge portion 211o of the groove opening portion 211 with respect to the tire circumferential direction has the relationship θ1o<θ2o to the maximum inclination angle θ2o of the outer edge portion 212o of the groove bottom portion 212 with respect to the tire circumferential direction (see FIG. 3). In such a configuration, since the inclination angle of the groove wall of the shoulder main groove 21 with respect to the tire circumferential direction increases from the groove opening portion 211 to the groove bottom portion 212, this has an advantage that the tear resistance performance and the stone rejecting performance of the tire are improved compared to a configuration (not illustrated) in which inclination angles of walls are constant.

In the pneumatic tire 1, the maximum inclination angles θ1o, θ2o of the groove opening portion 211 and the groove bottom portion 212 have the relationship 1.50≤θ2o/θ1o≤2.00. This has the advantage that the ratio θ2o/θ1o of the maximum inclination angles θ1o, θ2o is made appropriate. In other words, the lower limit ensures the effect of improving the tear resistance performance and the stone rejecting performance of the tire brought by the change in the inclination angles of the groove walls. The upper limit suppresses overconcentration of a load due to an excessive change in the inclination angle of the groove wall.

In the pneumatic tire 1, the wavelength λ1o of the outer edge portion 211o of the groove opening portion 211 has the relationship 0.90≤λ2o/λ1o≤1.10 to the wavelength A2o of the outer edge portion 212o of the groove bottom portion 212 (see FIG. 3). As a result, the wavelength A2o of the groove bottom portion 212 is set to be substantially identical to the wavelength λ1o of the groove opening portion 211.

In the pneumatic tire 1, the amplitude A1o of the outer edge portion 211o of the groove opening portion 211 has the relationship 1.00≤A2o/A1o≤2.00 to the amplitude A2o of the outer edge portion 212o of the groove bottom portion 212 (see FIG. 3). In such a configuration, since the amplitude A2o of the zigzag shape of the groove bottom portion 212 is set to be equal to or more than the amplitude A1o of the zigzag shape of the groove opening portion 211, there is an advantage that the three-dimensional groove wall structure of the shoulder main groove 21 described above can be efficiently formed.

In the pneumatic tire 1, the maximum distance L1o in the tire circumferential direction between the outer maximum amplitude position P1oo and the inner maximum amplitude position P2oi in the outer edge portion 211o of the groove opening portion 211 has the relationship $1.10 \leq L2o/L1o \leq 1.40$ to the maximum distance L2o in the tire circumferential direction between the outer maximum amplitude position P2oo and the inner maximum amplitude position P2oi in the outer edge portion 212o of the groove bottom portion 212 (see FIG. 3). Thus, there is an advantage that the three-dimensional groove wall structure of the shoulder main groove 21 described above can be efficiently formed.

In the pneumatic tire 1, the offset amount φoo between the outer maximum amplitude positions P1oo, P2oo in the outer edge portions 211o, 212o of the groove opening portion 211 and the groove bottom portion 212 has the relationship φoi<φoo to the offset amount φoi between the inner maximum amplitude positions P1oi, P2oi (see FIG. 3). This has an advantage that the above-described offset amount φ between the outer maximum amplitude position P1oo, P2oo can be efficiently formed.

In the pneumatic tire 1, the maximum distance L2o in the tire circumferential direction between the outer maximum amplitude position P2oo and the inner maximum amplitude position P2oi in the outer edge portion 212o of the groove bottom portion 212 has the relationship $0.55 \leq L2o/\lambda 2o \leq 0.65$ to the wavelength λ2o of the outer edge portion 212o (see FIG. 3). This has an advantage that the above-described offset amount φ between the outer maximum amplitude position P1oo, P2oo can be efficiently formed.

In the pneumatic tire 1, the maximum distance L1o in the tire circumferential direction between the outer maximum amplitude position P1oo and the inner maximum amplitude position P1oi in the outer edge portion 211o of the groove opening portion 211 has the relationship $0.50 \leq L1o/\lambda 1o \leq 0.60$ to the wavelength λ1o of the outer edge portion 211o (see FIG. 3). This has an advantage that the rigidity of the tread contact surface of a new tire is made uniform in the tire circumferential direction.

In the pneumatic tire 1, the groove wall angle α1oo at the outer maximum amplitude position P1oo of the outer edge portion 211o of the groove opening portion 211 has the relationship α2oo<α1oo to the groove wall angle α2oo at the outer maximum amplitude position P2oo of the outer edge portion 212o of the groove bottom portion 212 (see FIG. 4). In such a configuration, the groove wall angles α1oo, α2oo of the shoulder main groove 21 change sterically in the tire circumferential direction brought by the offset between the outer maximum amplitude positions P1oo, P2oo of the groove opening portion 211 and the groove bottom portion 212 described above. This has the advantage that the stone trapping of the shoulder main groove 21 is effectively suppressed.

In the pneumatic tire 1, the groove wall angles α1oo, α1oi at the outer maximum amplitude position P1oo and the inner maximum amplitude position P1oi of the outer edge portion 211o of the groove opening portion 211 have the relationship α1oo<α1oi (see FIG. 5). As a result, since the groove wall angles α1oo, α1oi of the shoulder main groove 21 change sterically in the tire circumferential direction, there is an advantage that the stone trapping of the shoulder main groove 21 is effectively suppressed.

In the pneumatic tire 1, the circumferential main grooves that meet the conditions described above are the shoulder main grooves 21 on the outermost side in the tire width direction (see FIG. 2). Since the tear of the land portion is likely to occur in the shoulder land portions 31, the shoulder main grooves 21 that define the shoulder land portions 31 meeting the conditions described above bring the advantage that the tear resistance performance of the tire is effectively improved.

In the pneumatic tire 1, the land portions 31 on the outer side in the tire width direction defined by the circumferential main grooves 21 are the ribs continuous in the tire circumferential direction, and the land portions 32 on the inner side in the tire width direction defined by the circumferential main grooves 21 include the plurality of lug grooves 321 (see FIG. 2).

The pneumatic tire 1 includes the circumferential main grooves 21 extending in the tire circumferential direction and the land portions 31, 32 defined by the circumferential main grooves 21 (See FIG. 2). The groove opening portion 211 and the groove bottom portion 212 in the circumferential main groove 21 each have the zigzag shape or the wave-like shape with the amplitude in the tire width direction (see FIG. 8). The outer maximum amplitude position P1co of the center line 211c of the groove opening portion 211 is disposed to be offset in the tire circumferential direction with respect to the outer maximum amplitude position P2co of the center line 212c of the corresponding groove bottom portion 212. This has the advantage that the tear resistance performance of the tire is improved and the stone rejecting performance of the tire is improved.

The pneumatic tire 1 includes the plurality of circumferential main grooves 21, 22 extending in the tire circumferential direction and the plurality of land portions 31 to 33 defined by the circumferential main grooves 21, 22 (See FIG. 2). The first and second circumferential main grooves (for example, the shoulder main groove 21 and the center main groove 22 in FIG. 10) adjacent to one another include the groove opening portions 211, 221 and the groove bottom portions 212, 222 each having the zigzag shape or the wave-like shape with the amplitude in the tire width direction (see FIGS. 3 and 7). In the first circumferential main groove (one of the shoulder main groove 21 and the center main groove 22 in FIG. 10, especially the shoulder main groove 21 in FIG. 10), the offset amount φoo_sh in the tire circumferential direction between the outer maximum amplitude position P1oo_sh of the groove opening portion 211 and the outer maximum amplitude position P2oo_sh of the groove bottom portion 212 has the relationship $0.03 \leq \varphi oo\_sh/\lambda 1o \leq 0.25$ to the wavelength λ1o of the outer edge portion 211o of the groove opening portion 211 (the wavelength λ1o_sh of the groove opening portion 211 in the shoulder main groove 21 in FIG. 10) (see FIG. 10). The displacement amount δ in the tire circumferential direction between the outer maximum amplitude position P2oo_sh of the groove bottom portion 212 in the first circumferential main groove 21 and the outer maximum amplitude position P2oo_ce of the groove bottom portion 222 in the second circumferential main groove (the other one of the shoulder main groove 21 and the center main groove 22 in FIG. 10, especially the center main groove 22 in FIG. 10) has the relationship $0 \leq \delta/\lambda 1o \leq 0.03$ to the wavelength λ1o of the groove opening portion 211 in the first circumferential main groove 21.

In such a configuration, (1) since the groove opening portion 211 and the groove bottom portion 212 are mutually offset in the tire circumferential direction at the outer edge portion 211o in the tire width direction in the first circumferential main groove 21, the rigidity of the land portion (in particular, the shoulder land portion 31 in FIG. 10) defined by the outer edge portion 211o in the circumferential main groove 21 is reinforced. This suppresses the tear of the land portion 31 and improves the tear resistance performance of the tire. At the same time, (2) since the outer maximum amplitude positions P2oo, P2oo_ce of the groove bottom portions 212, 222 of the adjacent circumferential main grooves 21, 22 are disposed with the positions in the tire circumferential direction aligned, the rigidity of the land portions 31, 32 is made uniform. As a result, the uneven wear of the land portions 31, 32 (specifically, for example, wavy wear of the shoulder land portion 31 and heel and toe wear of a block defined by the lug grooves 321) is suppressed, and the uneven wear resistance performance of the tire is maintained. There is an advantage that tear resistance performance can be improved with the uneven wear resistance performance of the tire maintained by (1) and (2).

In the pneumatic tire 1, the first circumferential main grooves described above are the shoulder main grooves 21 disposed on the outermost side in the tire width direction. As a result, there is an advantage that the rigidity of the shoulder land portion 31 in which the tear is likely to occur is relatively reinforced, and the effect of improving the tear resistance performance described above is efficiently obtained.

In the pneumatic tire 1, among the first and second circumferential main grooves 21, 22, the offset amount $\varphi oo\_sh$ between the groove opening portion 211 and the groove bottom portion 212 in the circumferential main groove 21 on the outer side in the tire width direction has the relationship $\varphi oo\_ce < \varphi oo\_sh$ to the offset amount $\varphi oo\_ce$ between the groove opening portion 221 and the groove bottom portion 222 of the circumferential main groove 22 on the inner side in the tire width direction (see FIG. 10). As a result, there is an advantage that the rigidity of the land portions 31 on the outer side in the tire width direction where a tear is likely to occur is relatively reinforced, and the effect of improving the tear resistance performance described above is effectively obtained.

In the pneumatic tire 1, the amplitude $A1o\_sh$ of the outer edge portion 211$o$ of the groove opening portion 211 in the first circumferential main groove 21 has the relationship $0.40 \leq A1o\_sh/A1o\_ce \leq 0.80$ to the amplitude $A1o\_ce$ of the outer edge portion 221$o$ of the groove opening portion 221 in the second circumferential main groove 22 (see FIG. 10). As a result, there is an advantage that the rigidity of the land portion 31 on the outer side in the tire width direction where a tear is likely to occur is relatively reinforced.

In the pneumatic tire 1, the amplitude $A2o\_sh$ of the outer edge portion 212$o$ of the groove bottom portion 212 in the first circumferential main groove 21 has the relationship $0.80 \leq A2o\_sh/A2o\_ce \leq 1.50$ to the amplitude $A2o\_ce$ of the outer edge portion 222$o$ of the groove bottom portion 222 in the second circumferential main groove 22 (see FIG. 10). As a result, there is an advantage that the rigidity of the land portion 31 on the outer side in the tire width direction where a tear is likely to occur is relatively reinforced.

In the pneumatic tire 1, the maximum inclination angle $\theta 1o\_sh$ of the outer edge portion 211$o$ of the groove opening portion 211 in the circumferential main groove 21 on the outer side in the tire width direction among the first and second circumferential main grooves 21, 22 has the relationship $0.50 \leq \theta 1o\_sh/\theta 1o\_ce < 1.00$ to the maximum inclination angle $\theta 1o\_ce$ of the outer edge portion 221$o$ of the groove opening portion 221 in the circumferential main groove 22 on the inner side in the tire width direction (see FIG. 10). As a result, there is an advantage that the rigidity of the land portion 31 on the outer side in the tire width direction where a tear is likely to occur is relatively reinforced.

In the pneumatic tire 1, the maximum inclination angle $\theta 2o\_sh$ of the outer edge portion 212$o$ of the groove bottom portion 212 in the circumferential main groove 21 on the outer side in the tire width direction among the first and second circumferential main grooves 21, 22 has the relationship $1.00 < \theta 2o\_sh/\theta 2o\_ce \leq 1.50$ to the maximum inclination angle $\theta 2o\_ce$ of the outer edge portion 222$o$ of the groove bottom portion 222 in the circumferential main groove 22 on the inner side in the tire width direction (see FIG. 10). As a result, there is an advantage that the rigidity of the land portion 31 on the outer side in the tire width direction where a tear is likely to occur is relatively reinforced. In the pneumatic tire 1, the maximum width $Wg1\_sh$ of the groove opening portion 211 in the circumferential main groove 21 on the outer side in the tire width direction among the first and second circumferential main grooves 21, 22 has the relationship $0.65 \leq Wg1\_sh/Wg1\_ce \leq 1.00$ to the maximum width $Wg1\_ce$ of the groove opening portion 221 in the circumferential main groove 22 on the inner side in the tire width direction (see FIG. 10). As a result, there is an advantage that the rigidity of the land portion 31 on the outer side in the tire width direction where a tear is likely to occur is relatively reinforced.

In the pneumatic tire 1, the maximum width $Wg2\_sh$ of the groove bottom portion 212 in the circumferential main groove 21 on the outer side in the tire width direction among the first and second circumferential main grooves 21, 22 has the relationship $0.55 \leq Wg2\_sh/Wg2\_ce \leq 0.75$ to the maximum width $Wg2\_ce$ of the groove bottom portion 222 in the circumferential main groove 22 on the inner side in the tire width direction (see FIG. 10). As a result, there is an advantage that the rigidity of the land portion 31 on the outer side in the tire width direction where a tear is likely to occur is relatively reinforced.

In the pneumatic tire 1, the maximum inclination angles $\theta 1o$, $\theta 2o$ of the groove opening portions 211, 221 and the groove bottom portions 212, 222 have the relationship $1.50 \leq \theta 2o/\theta 1o \leq 2.00$ (see FIGS. 3 and 7). This has the advantage that the ratio $\theta 2o/\theta 1o$ of the maximum inclination angles $\theta 1o$, $\theta 2o$ is made appropriate. In other words, the lower limit ensures the effect of improving the tear resistance performance and the stone rejecting performance of the tire brought by the change in the inclination angles of the groove walls. The upper limit suppresses the overconcentration of the load due to an excessive change in the inclination angle of the groove wall.

In the pneumatic tire 1, the maximum distance $L2o$ in the tire circumferential direction between the outer maximum amplitude position $P2oo$ and the inner maximum amplitude position $P2oi$ at the outer edge portions 212$o$, 222$o$ of the groove bottom portions 212, 222 has the relationship $0.55 \leq L2o/\lambda 2o \leq 0.65$ to the wavelength $\lambda 2o$ of the outer edge portions 212$o$, 222$o$ (see FIGS. 3 and 7). This has an advantage that the above-described offset amount $\varphi$ between the outer maximum amplitude position $P1oo$, $P2oo$ can be efficiently formed.

In the pneumatic tire 1, the maximum distance $L1o$ in the tire circumferential direction between the outer maximum amplitude position $P1oo$ and the inner maximum amplitude position $P1oi$ at the outer edge portions 211$o$, 221$o$ of the groove opening portions 211, 221 has the relationship $0.50 \leq L1o/\lambda 1o \leq 0.60$ to the wavelength $\lambda 1o$ of the outer edge portions 211$o$, 221$o$ (see FIGS. 3 and 7). This has an advantage that the rigidity of the tread contact surface of a new tire is made uniform in the tire circumferential direction.

The pneumatic tire 1 includes the three or more circumferential main grooves 21, 22 and the four or more rows of the land portions 31 to 33 defined by the circumferential main grooves 21, 22 (see FIG. 2). The sum total Σδ of the displacement amounts δ between the outer maximum amplitude positions P1oo_sh, P1oo_ce of the groove bottom portions 212, 222 in all of the circumferential main grooves 21, 22 has the relationship 0≤Σδ/λ1o≤0.03 to the wavelength λ1o of the groove opening portion 211 in the circumferential main groove 21 on the outermost side in the tire width direction (see FIG. 10). In such a configuration, since the outer maximum amplitude positions P2oo_sh, P2oo_ce of the groove bottom portions 212, 222 of all of the circumferential main grooves 21, 22 are disposed with the positions in the tire circumferential direction aligned, the rigidity of the land portions 31, 32 is made uniform throughout the tread. As a result, this has the advantage in that the uneven wear of the land portions 31, 32 is effectively suppressed.

In the pneumatic tire 1, the first circumferential main groove 21 has the maximum groove width Wg1 of not less than 6.0 mm and the maximum groove depth of not less than 10 mm (see FIG. 4). Specifically, the configuration described above employed to, for example, a heavy duty tire including circumferential main grooves having large groove width and groove depth brings the advantage that the effect regarding the tear resistance performance and the uneven wear resistance performance of the tire can be significantly obtained.

In the pneumatic tire 1, the land portion 32 includes the lug grooves 321. The lug groove 321 has the groove width W21 (see FIG. 3) having the relationship 0.02≤W21/Pa≤0.10 to the pitch length Pa (see FIG. 2) of the lug grooves 321. In such a configuration, the land portion 32 including the lug grooves 321 with the narrow groove width brings the advantage that the uneven wear resistance performance of the tire is improved.

Example 1

FIG. 11 is a table showing results of performance tests of pneumatic tires according to embodiments of the technology.

In the performance tests, (1) tear resistance performance and (2) stone rejecting performance were evaluated for a plurality of types of test tires. Test tires having a tire size of 315/80R22.5 are assembled on rims specified by JATMA, and an internal pressure specified by JATMA and a load specified by JATMA are applied to the test tires. The test tires are mounted on drive shafts of a 2-DD (front loader), which is a test vehicle.

(1) In the evaluation of tear resistance performance, the test vehicle performs cornering and after riding over a curb having the height of 200 mm 20 times, occurrence of a tear in a shoulder land portion is observed. The observation results are expressed as index values and evaluated with the Conventional Example being assigned as the reference (100). Larger values are preferable.

(2) In the evaluation of stone rejecting performance, after the test vehicle travels on a general paved road for twenty thousand km, the number of foreign materials trapped in the main grooves is counted. The measurement results are expressed as index values and evaluated with the Conventional Example being assigned as the reference (100). Larger values are preferable.

Test tires of Example 1 to 11 have the configuration of FIGS. 1 and 2, and the zigzag shapes of the groove opening portions and the zigzag shapes of the groove bottom portions in the circumferential main grooves 21, 22 are disposed to be offset in the tire circumferential direction. Additionally, all of the circumferential main grooves 21, 22 have the structure illustrated in FIG. 3, and the maximum amplitude positions P1oo, P2oo on the outer side in the tire width direction are offset in the tire circumferential direction and the maximum amplitude positions P1ii, P2ii on the inner side in the tire width direction are aligned at the bent portions of the zigzag shapes of the groove opening portion 211 and the groove bottom portion 212. Additionally, the tire ground contact width TW is 275 mm, and the distances Dg1, Dg2 of the circumferential main grooves 21, 22 are Dg1=80 mm and Dg2=29 mm. In addition, the wavelength λ1o of the zigzag shapes of the groove opening portions 211, 221 of the circumferential main grooves 21, 22 is λ1o=77 mm, and the amplitude A1o=13 mm.

In the test tire of Conventional Example, in the test tire of Example 1, the zigzag shapes of the groove opening portions and the zigzag shapes of the groove bottom portions in all of the circumferential main grooves 21, 22 are disposed such that both inner and outer maximum amplitude positions in the tire width direction are aligned in the tire circumferential direction.

As seen from the test results, the tear resistance performance and the stone rejecting performance of the tire are improved in the test tires of Examples.

Second Embodiment

FIGS. 12A-12B include a table showing the results of performance tests of pneumatic tires according to embodiments of the technology.

In the performance tests, (1) tear resistance performance and (2) uneven wear resistance performance were evaluated for a plurality of types of test tires. Test tires having a tire size of 315/80R22.5 are assembled on rims specified by JATMA, and an internal pressure specified by JATMA and a load specified by JATMA are applied to the test tires. The test tires are mounted on drive shafts of a 2-DD (front loader), which is a test vehicle.

(1) In the evaluation of tear resistance performance, the test vehicle performs cornering and after riding over a curb having the height of 200 mm 20 times, occurrence of a tear in a shoulder land portion is observed. The observation results are expressed as index values and evaluated with the Conventional Example being assigned as the reference (100). Larger values are preferable.

(2) In the evaluation of uneven wear resistance performance, after the test vehicle travels on a general paved road for twenty thousand km, a difference in an amount of wear (amount of heel and toe wear) of circumferential edge portions of blocks in a middle land portion is measured. The results are expressed as index values and evaluated with the Conventional Example being assigned as the reference (100). Larger values are preferable. The value of 97 or more means that uneven wear resistance performance is maintained.

Test tires of Examples 1 to 13 have the configuration illustrated in FIGS. 1 and 2, and the zigzag shapes of the groove opening portions and the zigzag shapes of the groove bottom portions of the circumferential main grooves 21, 22 are disposed to be offset in the tire circumferential direction. Additionally, all of the shoulder main grooves 21 and the center main grooves 22 have the structure illustrated in FIGS. 3 and 7, and the maximum amplitude positions P1oo, P2oo on the outer side in the tire width direction are offset in the tire circumferential direction at the bent portions having the zigzag shapes of the groove opening portions 211 and the groove bottom portions 212. Meanwhile, as illustrated in FIG. 10, the outer maximum amplitude positions P2oo_sh and P2oo_ce of the groove bottom portions 212, 222 in all of the circumferential main grooves 21, 22 are disposed with the positions in the tire circumferential direction aligned. Additionally, the tire ground contact width TW is 275 mm, and the distances Dg1, Dg2 of the circumferential main grooves 21, 22 are Dg1=80 mm and Dg2=29 mm. In addition, the wavelength λ1o of the zigzag shapes of the groove opening portions 211, 221 of the circumferential main grooves 21, 22 is λ1o=77 mm, and the amplitude A1o=13 mm.

In the test tire of Conventional Example, in the test tire of Example 1, the zigzag shapes of the groove opening portions and the zigzag shapes of the groove bottom portions in all of the circumferential main grooves 21, 22 are disposed such that both inner and outer maximum amplitude positions in the tire width direction are aligned in the tire circumferential direction.

As seen from the test results, with the test tires of Examples, tear resistance performance can be improved while the uneven wear resistance performance of the tire is maintained.

The invention claimed is:

1. A pneumatic tire, comprising:
   a circumferential main groove extending in a tire circumferential direction; and
   a land portion defined by the circumferential main groove,
   the circumferential main groove comprising a groove opening portion and a groove bottom portion each having a zigzag shape or a wave-like shape with an amplitude in a tire width direction,
   in each of the groove opening portion and the groove bottom portion, an outer edge portion on an outer side in the tire width direction being defined, an outer maximum amplitude position projecting to the outer side in the tire width direction and an inner maximum amplitude position projecting to an inner side in the tire width direction being defined in the outer edge portion, and
   the outer maximum amplitude position of the outer edge portion in the groove opening portion being disposed to be offset in the tire circumferential direction with respect to the outer maximum amplitude position of the outer edge portion of the groove bottom portion, wherein
   an offset amount φoo between the outer maximum amplitude positions in the outer edge portions of the groove opening portion and the groove bottom portion has a relationship $0.03 \leq \varphi oo/\lambda 1o \leq 0.45$ to a wavelength λ1o of the outer edge portion of the groove opening portion, and
   a wavelength λ1o of the outer edge portion of the groove opening portion has a relationship $0.90 \leq \lambda 2o/\lambda 1o \leq 1.10$ to a wavelength λ2o of the outer edge portion of the groove bottom portion.

2. The pneumatic tire according to claim 1, wherein a maximum inclination angle θ1o of the outer edge portion of the groove opening portion with respect to the tire circumferential direction has a relationship $\theta 1o < \theta 2o$ to a maximum inclination angle θ2o of the outer edge portion of the groove bottom portion with respect to the tire circumferential direction.

3. The pneumatic tire according to claim 2, wherein the maximum inclination angles θ1o, θ2o of the groove opening portion and the groove bottom portion have a relationship $1.50 \leq \theta 2o/\theta 1o \leq 2.00$.

4. The pneumatic tire according to claim 1, wherein an amplitude A1o of the outer edge portion of the groove opening portion has a relationship $1.00 \leq A2o/A1o \leq 2.00$ to an amplitude A2o of the outer edge portion of the groove bottom portion.

5. The pneumatic tire according to claim 1, wherein a maximum distance L1o in the tire circumferential direction between the outer maximum amplitude position and the inner maximum amplitude position in the outer edge portion of the groove opening portion has a relationship $1.10 \leq L2o/L1o \leq 1.40$ to a maximum distance L2o in the tire circumferential direction between the outer maximum amplitude position and the inner maximum amplitude position in the outer edge portion of the groove bottom portion.

6. The pneumatic tire according to claim 1, wherein an offset amount φoo between the outer maximum amplitude positions in the outer edge portions of the groove opening portion and the groove bottom portion has a relationship $\varphi oi < \varphi oo$ to an offset amount φoi between the inner maximum amplitude positions.

7. The pneumatic tire according to claim 1, wherein a maximum distance L2o in the tire circumferential direction between the outer maximum amplitude position and the inner maximum amplitude position in the outer edge portion of the groove bottom portion has a relationship $0.55 \leq L2o/\lambda 2o \leq 0.65$ to a wavelength λ2o of the outer edge portion of the groove bottom portion.

8. The pneumatic tire according to claim 1, wherein a maximum distance L1o in the tire circumferential direction between the outer maximum amplitude position and the inner maximum amplitude position in the outer edge portion of the groove opening portion has a relationship $0.50 \leq L1o/\lambda 1o \leq 0.60$ to a wavelength λ1o of the outer edge portion.

9. The pneumatic tire according to claim 1, wherein a groove wall angle α1oo at the outer maximum amplitude position of the outer edge portion of the groove opening portion has a relationship $\alpha 2oo < \alpha 1oo$ to a groove wall angle α2oo at the outer maximum amplitude position of the outer edge portion of the groove bottom portion.

10. The pneumatic tire according to claim 1, wherein groove wall angles α1oo, α1oi at the outer maximum amplitude position and the inner maximum amplitude position of the outer edge portion of the groove opening portion have a relationship $\alpha 1oo < \alpha 1oi$.

11. The pneumatic tire according to claim 1, wherein the circumferential main groove is a shoulder main groove on an outermost side in the tire width direction.

12. The pneumatic tire according to claim 1, wherein the land portion defined by the circumferential main groove comprises a land portion on the outer side and a land portion on the inner side, the land portion on the outer side in the tire width direction defined by the circumferential main groove is a rib continuous in the tire circumferential direction, and the land portion on the inner side in the tire width direction defined by the circumferential main groove comprises a plurality of lug grooves.

13. A pneumatic tire, comprising:
   a plurality of circumferential main grooves extending in a tire circumferential direction, the plurality of circumferential main grooves including a first circumferential main groove and a second circumferential main groove; and
   a plurality of land portions defined by the plurality of circumferential main grooves,
   the first and second circumferential main grooves adjacent to one another each comprising a groove opening portion and a groove bottom portion each having a zigzag shape or a wave-like shape with an amplitude in a tire width direction, in each of the groove opening portion and the groove bottom portion, an outer edge portion on an outer side in the tire width direction and an inner edge portion on an inner side in the tire width direction being defined, an outer maximum amplitude position projecting to the outer side in the tire width direction and an inner maximum amplitude position projecting to the inner side in the tire width direction being defined in each of the outer edge portion and the inner edge portion, in the first circumferential main groove, an offset amount φoo in the tire circumferential direction between the outer maximum amplitude position of the groove opening portion and the outer maximum amplitude position of the groove bottom portion having a relationship $0.03 \leq \varphi oo/\lambda 1o \leq 0.25$ to a wavelength $\lambda 1o$ of the outer edge portion of the groove opening portion, and a displacement amount δ in the tire circumferential direction between the outer maximum amplitude position of the groove bottom portion in the first circumferential main groove and the outer maximum amplitude position of the groove bottom portion in the second circumferential main groove having a relationship $0 \leq \delta/\lambda 1o \leq 0.03$ to the wavelength $\lambda 1o$ of the groove opening portion in the first circumferential main groove, wherein a maximum width Wg2_sh of the groove bottom portion in the circumferential main groove on the outer side in the tire width direction among the first and second circumferential main grooves has a relationship $0.55 \leq Wg2\_sh/Wg2\_ce \leq 0.75$ to a maximum width Wg2_ce of the groove bottom portion in the circumferential main groove on the inner side in the tire width direction.

14. The pneumatic tire according to claim 13, wherein the first circumferential main groove is a shoulder main groove disposed on an outermost side in the tire width direction.

15. The pneumatic tire according to claim 13, wherein among the first and second circumferential main grooves, an offset amount φoo_sh between the groove opening portion and the groove bottom portion in the circumferential main groove on the outer side in the tire width direction has a relationship φoo_ce<φoo_sh to an offset amount φoo_ce between the groove opening portion and the groove bottom portion in the circumferential main groove on the inner side in the tire width direction.

16. The pneumatic tire according to claim 13, wherein an amplitude A1o_sh of the outer edge portion of the groove opening portion in the first circumferential main groove has a relationship $0.40 \leq A1o\_sh/A1o\_ce \leq 0.80$ to an amplitude A1o_ce of the outer edge portion of the groove opening portion in the second circumferential main groove.

17. The pneumatic tire according to claim 13, wherein an amplitude A2o_sh of the outer edge portion of the groove bottom portion in the first circumferential main groove has a relationship $0.80 \leq A2o\_sh/A2o\_ce \leq 1.50$ to an amplitude A2o_ce of the outer edge portion of the groove bottom portion in the second circumferential main groove.

18. The pneumatic tire according to claim 13, wherein a maximum inclination angle θ1o_sh of the outer edge portion of the groove opening portion in the circumferential main groove on the outer side in the tire width direction among the first and second circumferential main grooves has a relationship $0.50 \leq \theta 1o\_sh/\theta 1o\_ce < 1.00$ to a maximum inclination angle θ1o_ce of the outer edge portion of the groove opening portion in the circumferential main groove on the inner side in the tire width direction.

19. The pneumatic tire according to claim 13, wherein a maximum inclination angle θ2o_sh of the outer edge portion of the groove bottom portion in the circumferential main groove on the outer side in the tire width direction among the first and second circumferential main grooves has a relationship $1.00 < \theta 2o\_sh/\theta 2o\_ce \leq 1.50$ to a maximum inclination angle θ2o_ce of the outer edge portion of the groove bottom portion in the circumferential main groove on the inner side in the tire width direction.

20. The pneumatic tire according to claim 13, wherein a maximum width Wg1_sh of the groove opening portion in the circumferential main groove on the outer side in the tire width direction among the first and second circumferential main grooves has a relationship $0.65 \leq Wg1\_sh/Wg\_1\_ce \leq 1.00$ to a maximum width Wg1_ce of the groove opening portion in the circumferential main groove on the inner side in the tire width direction.

21. The pneumatic tire according to claim 13, wherein a maximum inclination angle θ1o of the outer edge portion of the groove opening portion with respect to the tire circumferential direction has a relationship θ1o<θ2o to a maximum inclination angle θ2o of the outer edge portion of the groove bottom portion with respect to the tire circumferential direction, and the maximum inclination angles θ1o, θ2o of the groove opening portion and the groove bottom portion have a relationship $1.50 \leq \theta 2o/\theta 1o \leq 2.00$.

22. The pneumatic tire according to claim 13, wherein a maximum distance L2o in the tire circumferential direction between the outer maximum amplitude position and the inner maximum amplitude position in the outer edge portion of the groove bottom portion has a relationship $0.55 \leq L2o/\lambda 2o \leq 0.65$ to a wavelength $\lambda 2o$ of the outer edge portion of the groove bottom portion.

23. The pneumatic tire according to claim 13, wherein a maximum distance L1o in the tire circumferential direction between the outer maximum amplitude position and the inner maximum amplitude position in the outer edge portion of the groove opening portion has a relationship $0.50 \leq L1o/\lambda 1o \leq 0.60$ to the wavelength $\lambda 1o$ of the outer edge portion.

24. The pneumatic tire according to claim 13, comprising:

three or more of the circumferential main grooves; and four or more rows of the land portions defined by the circumferential main grooves, and a sum total $\Sigma \delta$ of displacement amounts δ between the outer maximum amplitude positions of the groove bottom portions in all of the circumferential main grooves has a relationship $0 \leq \Sigma \delta/\lambda 1o \leq 0.03$ to the wavelength $\lambda 1o$ of the groove opening portion in the circumferential main groove on an outermost side in the tire width direction.

25. The pneumatic tire according to claim 13, wherein the first circumferential main groove has a maximum groove width of not less than 6.0 mm and a maximum groove depth of not less than 10 mm.

26. The pneumatic tire according to claim 13, wherein each of the land portions comprises a lug groove penetrating the land portions, and a maximum groove width W21 of each of the lug grooves has a relationship $0.02 \leq W21/Pc \leq 0.10$ to a pitch length Pa of the lug grooves.

27. A pneumatic tire, comprising:

a circumferential main groove extending in a tire circumferential direction; and a land portion defined by the circumferential main groove, the circumferential main groove comprising a groove opening portion and a groove bottom portion each having a zigzag shape or a wave-like shape with an amplitude in a tire width direction, in each of the groove opening portion and the groove bottom portion, an outer edge portion on an outer side in the tire width direction being defined, an outer maximum amplitude position projecting to the outer side in the tire width direction and an inner maximum amplitude position projecting to an inner side in the tire width direction being defined in the outer edge portion, and the outer maximum amplitude position of the outer edge portion in the groove opening portion being disposed to be offset in the tire circumferential direction with respect to the outer maximum amplitude position of the outer edge portion of the groove bottom portion, wherein an offset amount φoo between the outer maximum amplitude positions in the outer edge portions of the groove opening portion and the groove bottom portion has a relationship $0.03 \leq \varphi oo/\lambda 1o \leq 0.45$ to a wavelength $\lambda 1o$ of the outer edge portion of the groove opening portion, and a groove wall angle $\alpha 1oo$ at the outer maximum amplitude position of the outer edge portion of the groove opening portion has a relationship $\alpha 2oo < \alpha 1oo$ to a groove wall angle $\alpha 2oo$ at the outer maximum amplitude position of the outer edge portion of the groove bottom portion.

* * * * *